US010518985B2

(12) United States Patent
Strobel et al.

(10) Patent No.: US 10,518,985 B2
(45) Date of Patent: Dec. 31, 2019

(54) CONTROL SYSTEMS AND METHODS FOR VACUUM LIFT EQUIPMENT

(71) Applicant: Wood's Powr-Grip Co., Inc., Laurel, MT (US)

(72) Inventors: Steven Jerald Strobel, Billings, MT (US); Martin Andrew Peterson, Billings, MT (US); Bryan Kirk Strobel, Billings, MT (US)

(73) Assignee: Wood's Powr-Grip Co., Inc., Laurel, MT (US)

( * ) Notice: Subject to any disclaimer, the term of this patent is extended or adjusted under 35 U.S.C. 154(b) by 198 days.

(21) Appl. No.: 15/605,791

(22) Filed: May 25, 2017

(65) Prior Publication Data

US 2017/0341880 A1    Nov. 30, 2017

Related U.S. Application Data

(60) Provisional application No. 62/343,543, filed on May 31, 2016.

(51) Int. Cl.
*G06F 19/00* (2018.01)
*B65G 47/91* (2006.01)
(Continued)

(52) U.S. Cl.
CPC ........ *B65G 47/917* (2013.01); *B25J 15/0616* (2013.01); *B65G 49/061* (2013.01);
(Continued)

(58) Field of Classification Search
CPC ............... B65G 47/917; B65G 49/061; B65G 2249/045; B25J 15/0616; B66C 1/0218; B66C 1/0256
(Continued)

(56) References Cited

U.S. PATENT DOCUMENTS 3,171,549 A * 3/1965 Orloff ........................ B25J 3/04
294/106
3,717,249 A * 2/1973 Faley ..................... B65H 29/58
209/552
(Continued)

FOREIGN PATENT DOCUMENTS

DE         10140248 B4    3/2003
DE     102004013058 B4    9/2005
(Continued)

OTHER PUBLICATIONS

Single-Channel Lifter, DC-Voltage With Dual Vacuum System (Available With Remote Control System), Operating Instructions, Oct. 2015, 1-40, Model Numbers: P11004DC2, P1HV1104DC2, P11104DC2, Wood's Powr-Grip, Laurel, MT, USA 59044.
(Continued)

*Primary Examiner* — Ronnie M Mancho
(74) *Attorney, Agent, or Firm* — Husch Blackwell LLP

(57) ABSTRACT

A control system and method for a vacuum attachment system has a programmable controller that interprets feedback from vacuum level sensors and battery sensors to responsively provide warnings and limit or alter machine functions to reduce risk exposure. Vacuum levels and vacuum level change over time are used to evaluate conditions such as vacuum generator function, excessive altitude, vacuum system condition and leakage due to incompatibility of attachment device and load. Warnings are engaged if parameters or limits are not met. At designated/calculated thresholds and conditions the device can adjust its utilization of resources to ensure the safest condition. If conditions are detected that indicate a reduced ability to maintain the attachment, the programmable controller may limit functions such as preventing the operator from initiating another attachment.

23 Claims, 9 Drawing Sheets

(51) Int. Cl.
    *B25J 15/06*    (2006.01)
    *B66C 1/02*    (2006.01)
    *B65G 49/06*    (2006.01)

(52) U.S. Cl.
    CPC .......... *B66C 1/0218* (2013.01); *B66C 1/0256* (2013.01); *B65G 2249/045* (2013.01)

(58) Field of Classification Search
    USPC ................................................ 700/245, 260
    See application file for complete search history.

(56) References Cited

U.S. PATENT DOCUMENTS

| | | | |
|---|---|---|---|
| 5,390,785 A * | 2/1995 | Garric | G03F 7/70541 206/213.1 |
| 5,405,048 A * | 4/1995 | Rogers | B65G 1/1373 221/1 |
| 5,411,358 A * | 5/1995 | Garric | G03F 7/70541 414/277 |
| 5,795,001 A | 8/1998 | Burke | |
| 6,397,885 B1 | 6/2002 | Golden et al. | |
| 6,817,639 B2 | 11/2004 | Schmalz et al. | |
| 7,677,622 B2 | 3/2010 | Dunkmann et al. | |
| 9,678,025 B1 * | 6/2017 | Fesmire | G01N 25/72 |
| 2003/0091708 A1 * | 5/2003 | Garwood | A23B 4/16 426/392 |
| 2005/0285323 A1 * | 12/2005 | Gulbrandsen | B65H 5/26 271/9.11 |
| 2007/0269297 A1 * | 11/2007 | Meulen | B65G 25/02 414/222.01 |
| 2008/0174076 A1 | 7/2008 | Eisele et al. | |
| 2010/0095559 A1 * | 4/2010 | Buckner | E02F 3/8825 37/304 |
| 2010/0196129 A1 * | 8/2010 | Buckner | E02F 3/8825 414/467 |
| 2011/0046775 A1 * | 2/2011 | Bailey | B07C 3/00 700/224 |
| 2012/0161405 A1 * | 6/2012 | Mohn | C23C 16/401 279/142 |
| 2012/0319416 A1 * | 12/2012 | Ellis | B25J 15/0616 294/183 |
| 2014/0271083 A1 * | 9/2014 | Caveney | H01L 21/67173 414/749.5 |
| 2015/0259786 A1 * | 9/2015 | Ko | H01L 51/5253 118/50.1 |
| 2015/0283707 A1 | 10/2015 | Holecek et al. | |
| 2015/0375401 A1 | 12/2015 | Dunkmann et al. | |

FOREIGN PATENT DOCUMENTS

| | | |
|---|---|---|
| DE | 102005047385 B4 | 4/2007 |
| DE | 202006021243 U1 | 4/2014 |
| DE | 102014206308 A1 | 10/2015 |
| EP | 1781559 B1 | 1/2006 |
| EP | 2460757 A1 | 6/2012 |
| EP | 2815353 A1 | 12/2014 |
| JP | 2010082782 A | 4/2010 |
| JP | 2011156610 A | 8/2011 |
| WO | 9304824 A1 | 3/1993 |
| WO | 2013120802 A1 | 8/2013 |
| WO | 2013122997 A1 | 8/2013 |

OTHER PUBLICATIONS

Manual Rotator 2800 DC-Voltage, Operating Instructions, Jul. 2015, 1-40, Model Number: MR1611LDC, Wood's Powr-Grip, Laurel, MT, USA 59044.

* cited by examiner

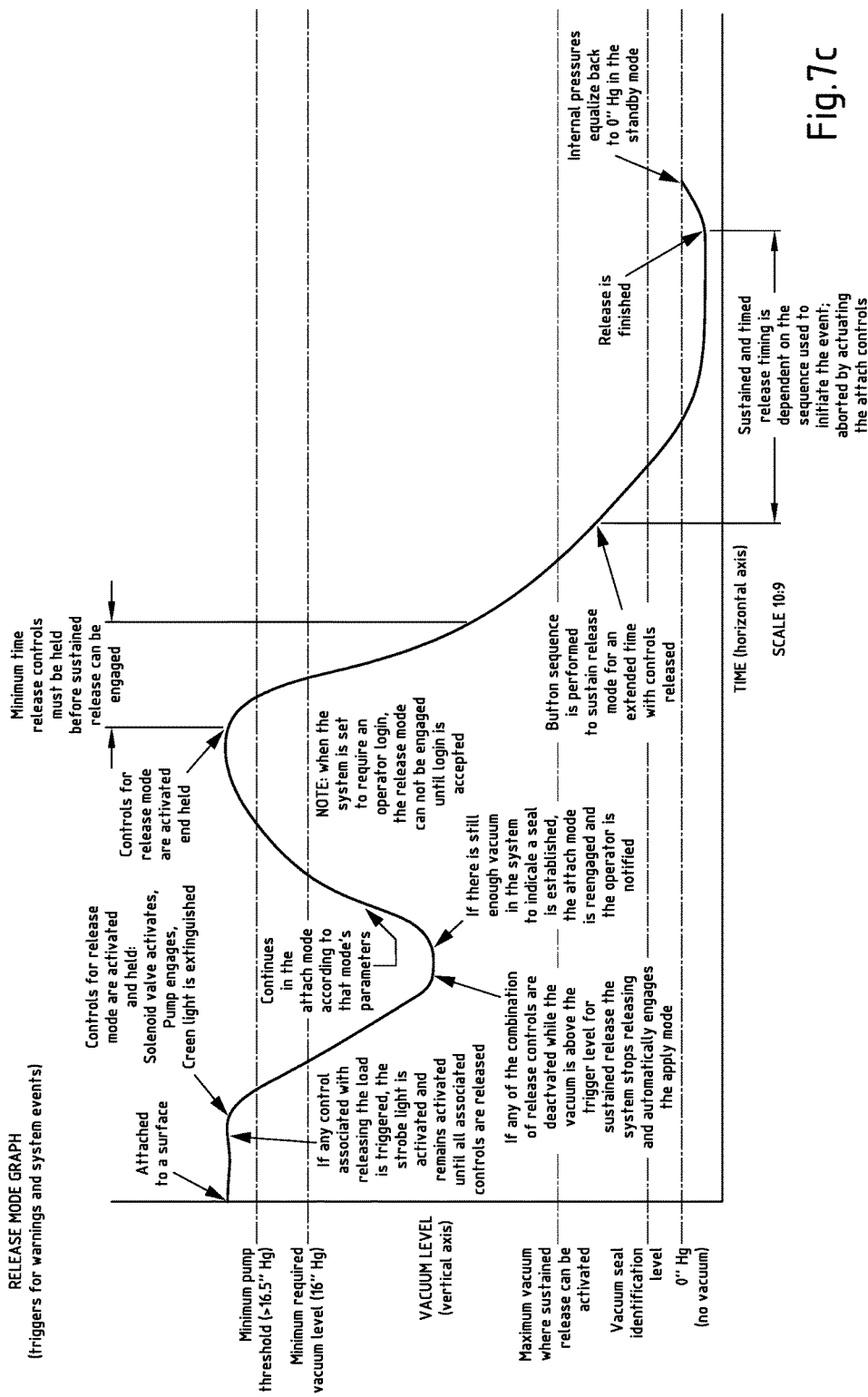

CONTROL SYSTEMS AND METHODS FOR VACUUM LIFT EQUIPMENT

CROSS-REFERENCE TO RELATED APPLICATIONS

This Application claims priority to U.S. Provisional Patent Application Ser. No. 62/343,543, filed on May 31, 2016, to Steven Jerald Strobel et al., entitled "Control Systems and Methods for Vacuum Lift Equipment," currently pending, the entire disclosure of which is incorporated herein by reference.

FIELD OF THE INVENTION

The present invention is generally directed to vacuum lifting equipment used for moving materials and material handling More particularly, the present invention is directed to control systems, methods, and devices for controlling a vacuum attachment device or system used for lifting or moving materials.

BACKGROUND OF THE INVENTION

In their most basic foil, vacuum lifters incorporate a system that includes a vacuum supply, some means of controlling when the vacuum is applied, and one or more vacuum pads or seals that interface with the surface to which it is being attached. By drawing air from between the vacuum pads and the interfacing material, vacuum is generated. This vacuum is a pressure differential between the local atmospheric pressure and the pressure between the vacuum pads and the attachment surface. The net result is a force that draws the vacuum pads and the surface together. This force allows for the material to be lifted or manipulated by means of the machine or similarly can be used to mount a device to a surface.

One of the key factors to the operational safety of vacuum lifting equipment is ensuring that a minimum vacuum level is maintained between the vacuum pads and surface. Many regional standards also extend this requirement to non-typical conditions, such as when system power is interrupted. The required minimum vacuum level depends on many factors including the number of vacuum pads, the size of the vacuum pads, the rigidity of the lift machine and of the material to which the lift machine is attached, the arrangement of the vacuum pads, the style of the vacuum pad seals, and the surface characteristics of the material. Additionally, the coefficient of friction between the vacuum pads and the material is an important factor.

Vacuum lifters commonly incorporate a basic means for controlling the supply of vacuum and providing indicators of the vacuum level. These functions are typically managed through the use of one or more vacuum switches set at predefined levels. When the preset levels are achieved either on a rising or falling vacuum progression, indicators and vacuum supply can change state.

More particularly, a vacuum attachment device consists of one or more vacuum circuits, wherein each circuit consists of several components connected using manifolds, hoses and/or fittings. Those components conventionally include (i) one or more vacuum pads each with a sealing edge and a face which resists sliding when pressed against a surface using the force generated by vacuum, (ii) a vacuum source such as a vacuum pump or venturi which can be used to evacuate the air from a vacuum circuit, (iii) a controller with two or more states, the first state being using to attach the vacuum attachment device to a surface by causing the vacuum source to be applied to the vacuum pad, and a second state used for detaching or releasing from said surface, in which state the vacuum source does not draw air from beneath the vacuum pads, and (iv) a control interface for the operator to select between the states of the controller so as to control whether the vacuum attachment device attaches to said surface or is released from it. This control interface may be a knob or lever which operates a controller implemented as a valve, switches or buttons for providing control signals to an electrical or electronic controller, or another type of interface with similar function.

Representative examples of vacuum attachment devices, and in particular vacuum lift equipment, are sold by Woods Powr-Grip Co., Inc., such as Wood's Powr-Grip Co., Inc.'s Channel Lifter and Manual Rotator 2800. A variety of instruction sheets for such devices and vacuum cups, identified as Operating Instructions for MODEL NUMBERS: P11004DC2, P1HV1104DC2, P11104DC2, SINGLE-CHANNEL LIFTER, DC-VOLTAGE WITH DUAL VACUUM SYSTEM (AVAILABLE WITH REMOTE CONTROL SYSTEM) and INSTRUCTIONS International Version MODEL NUMBER: MR1611LDC, MANUAL ROTATOR 2800 DC-VOLTAGE, are appended hereto and are hereby incorporated by reference into this disclosure as though all subject matter of such documents is expressly herein presented.

Vacuum attachment devices of this type are used in both stationary and lifting applications. Stationary applications include holding a device to a surface as an anchor point such as for a fall restraint system. Lifting applications include those in which a vacuum attachment device is mounted to a frame. The device is attached to a workpiece (such as a piece of glass, stone or metal), then the frame can be lifted in order to also lift and manipulate the workpiece.

Traditional control systems on below-the-hook vacuum lifters, such as those commonly used to lift sheet materials like glass, stone, metal, insulated panels, fiberglass, etc., are limited in their ability to manage and control nuances in the system response. It is the operator's responsibility to not only manage the process of attaching, lifting, positioning, and ensuring the load is securely placed before releasing, but also to monitor system functions, perceive changes in the function, regularly check indicators, and correlate these with their associated risks. In prior implementations, vacuum switches were used which switch from a first state to a second state at one vacuum level and back to the first state at a different vacuum level (i.e., they have a threshold level and utilize hysteresis). They are unable to distinguish between a large number of vacuum levels.

Accordingly, a need exists for vacuum-based handling equipment and controls that improve safety and enable an operator to better focus on their primary purpose in moving material. The present invention addresses this and other needs.

SUMMARY OF THE INVENTION

The present invention is directed generally to a programmable control system and related methods for a material handling system monitors attachment vacuum levels, rate of change of vacuum levels, and battery electrical condition to activate warnings and/or to control a vacuum system to prevent undesirable actions when measurements are outside of acceptable parameters. The programmable control system can utilize a programmable controller and high-resolution sensing circuits, such as vacuum sensors with 8 bit analog to digital converters according to one embodiment, that determine vacuum level or rate of change in vacuum level, and (in DC systems having a battery as a source of power) can determine the condition of the battery by monitoring voltage level of the battery and current draw on the battery and calculated rates of change of the voltage level of the battery and the current draw on the battery.

The vacuum and programmable control system can enable system components and conditions to be quickly sampled, the condition evaluated, and comparisons made to regional standards, prior function, calibration, and/or factory specifications. Such evaluations can be generated using a direct reading of vacuum levels and change in vacuum levels over time (long and short durations) during various system states. By evaluating these vacuum levels as a function of time and comparing them to various criteria, many safety features can be incorporated and realized and resources can be efficiently utilized. By storing vacuum level information in a system memory, calibration, historical performance, and usage data can be available for comparison and identifying trends, evidence of and need for maintenance, and other evaluation of conditions surrounding a relevant event.

Many different vacuum controlled elements can be independently or cooperatively managed by the programmable controller of the present invention. For example, according to one embodiment, throughout operation of the system, the vacuum level in each vacuum circuit of the system is continuously monitored and evaluated. Depending on the mode in which the system is operating, the criteria for the vacuum level and the type of response required based on monitoring of the vacuum level of the system are determined and executed as appropriate.

Upon system power up and when the system is in a standby mode, the vacuum level and rate of change can be monitored to identify if there is a possibility of a load being at least partially attached. If the vacuum level, change in vacuum level, and/or rate of change of the vacuum level reach threshold levels and/or are maintained for a period of time, the system can engage an attaching mode. This condition can also trigger warning indicators to communicate that an unanticipated attachment or partial attachment was identified.

According to one embodiment, once the attaching mode is engaged, either automatically or through operator controls, if the vacuum level is below an established threshold, the vacuum supply is engaged. The appropriate threshold can be managed and altered for many reasons including reduced atmospheric pressure, attachment to thin materials, lower required capacity, and inclusion of more vacuum pads. If adequate vacuum to reach maximum rated capacity is not obtained, an indicator signifying the degree of reduced capacity can be activated.

According to one embodiment, for each attachment cycle, the vacuum level is measured and rate of vacuum increase is calculated to determine whether a vacuum seal has been established. Once continuation is made, the vacuum reservoirs can be introduced into the system. While their primary purpose is as a safety reservoir, they can typically already be evacuated and will provide a burst of vacuum thus increasing the attachment rate.

According to one embodiment, when the attaching mode is activated by a functional command rather than unanticipated partial attachment, the vacuum level will continue to increase without activated warning indicators. If however the rate of increase does not meet the established calibrated or determined specifications for any specific range, a warning indicator can be activated to communicate that the system is not functioning to the minimum requirements and that further evaluation or tests may need to be performed.

Once the required vacuum level for lifting has been achieved, the system can activate an indicator to notify the operator of said condition. The vacuum supply can continue to be engaged to achieve a hysteresis in the pneumatic system between the minimum lifting vacuum level and the level at which the vacuum supply is disengaged. A timing element can be included to achieve a practical maximum vacuum to maximize lifting safety for the given barometric pressure and vacuum system conditions. When each vacuum system reaches the time and vacuum level thresholds, the vacuum supply may be disengaged to manage consumption of resources.

With no vacuum supply in the system, the system can be monitored for a reduction in vacuum over a short time period to predict if the security of the vacuum system meets manufacturer and regional requirements. If the requirements are not met, the operator can be notified by an indicator so that corrective action can be taken before attempting a lift. According to one embodiment, a system flag is also triggered to require correction or authorization to continue using the equipment.

The vacuum supply can reengage if the vacuum level in a system drops to an identified vacuum level to ensure it does not drop below the threshold required for lifting. The level at which the supply is reengaged may be elevated above this threshold level to maximize the safety in lifting.

According to one embodiment, a leak in the vacuum system is detected by repeatedly reading high-resolution vacuum level sensing circuits over time. An algorithm can be used to project the future amount of vacuum level drop and compare it with thresholds which indicate an unacceptable leak. If only one pneumatic system is incorporated into the equipment, the vacuum supply is engaged as necessary to ensure the minimum vacuum level is maintained. If multiple pneumatic systems are used, the time projections at which the minimum vacuum levels are crossed can be used to schedule the times at which the vacuum supply for each vacuum circuit will be engaged such that only one vacuum supply at a time needs to be engaged in order to maintain the minimum vacuum level on each vacuum circuit. This scheduling can minimize the required energy supply at any one time. If, however, the sequenced pattern cannot be practically achieved, multiple vacuum supplies may be run simultaneously thus devoting all available resources to ensure adequate vacuum is maintained in all of the pneumatic circuits.

If there is a case where the vacuum supply cannot maintain the vacuum level above the minimum thresholds, emergency warning indicators and wireless communications can be activated to notify the operator (and others) of the compromised situation.

During detachment from the material surface, the vacuum reservoirs can be removed from the system such that their vacuum is retained for enhanced attachment on the next cycle. Valves can be engaged to allow air to naturally enter or be forced into the system. When the controls for detachment are disengaged, the vacuum level in the system can be quickly sampled to identify if there is still partial attachment and the system evaluation cycle starts again.

Latching valves (rather than spring-return valves) may be used in order to minimize power consumption and to preserve the vacuum in the reservoirs even when the power is turned off According to one embodiment, to ensure that the vacuum reservoirs are incorporated into the vacuum circuit during an attachment, the valves are opened soon after the programmable controller detects that a seal has been established, before the operator is notified that the vacuum level is high enough to indicate a secure attachment.

Accordingly, the vacuum and vacuum control system of the present invention can enable real-time evaluation and feedback concerning the functioning of the system, including particularly whether the system is functioning properly and within the appropriate operating range for all defined system parameters according to mode of operation. The controller of the present invention can enable certain functions to be altered to preserve battery energy and other functions disabled to prevent hazardous actions when the system identifies a risk. These functions may be accomplished in a highly effective manner, without requiring significant operator experience and training, because the sensors and algorithms incorporated into the lifter can perform the evaluations quickly, consistently, and do not require continuous monitoring by the operator. According to one embodiment, the system enables the operator to be notified when conditions are changing or are unfavorable and provided with pertinent information relating to such changing or unfavorable conditions. Additional conveniences can be incorporated with more detailed operator feedback and process conveniences like automatic elevation compensation and timed function responses.

Accordingly, numerous improvements over traditional vacuum system equipment and related methods of control and operation are realized in the control systems, methods, and devices of the present invention for evaluating the vacuum levels in the vacuum lift system and their change over time. For example, according to one embodiment, if low levels of vacuum are suddenly generated in a system as may be the case when trying to remove a vacuum lifter from the surface of a load and those levels continue to exist after a short period of time, the load may accidentally be partially suspended and the lift device will respond by applying the vacuum source in an attempt to prevent the load from being dropped. As the vacuum system applies the vacuum, the rate at which the vacuum level increases can be evaluated with different criteria along the process. If rates are different than typical operation, the system can direct the operator to further evaluate the situation. Similarly, once the device is attached to a surface, any leakage and the severity of the leakage can be detected and evaluated within several seconds so warnings, as well as pertinent information indicative of the leakage (such as its rate), can be presented to the operator if the security of the seal does not meet required criteria.

Many vacuum lifting applications, such as those which might utilize a below-the-hook embodiment of the present invention, rely on batteries to provide power for the vacuum liter. The present invention can incorporate improvements in the evaluation of the battery's condition as well as in the analysis and application of those results. Specifically, the combination of the battery's condition, the current and past vacuum levels and rates of change, and/or operator inputs can be analyzed in order to both modify the current operation of the lifter (perhaps disabling lower-priority operations when the battery is unable to supply them and power the vacuum source simultaneously) and to anticipate and prevent operations for which the battery, in its current condition, might be unable to supply the necessary power. Reports of the battery's condition and of such prevented operations are presented to the operator. The system can prevent operators from starting a new attachment sequence if recommendations to charge or replace the battery are ignored and the safety of the process is being compromised. If sensors and algorithms determine marginal power is available to supply the safety critical components, power may be limited to other components to reserve system resources.

Using software algorithms for the system logic and memory to record system info' nation, the function of components can be optimized for energy efficiency and maximization of component life. Information stored and therefore available to an operator or service technician can include detailed information, including historical information, and can include graphical feedback on a display of the controller and/or on a remote display to which data and/or graphical information is wirelessly transmitted Other aspects and advantages of the present invention will be apparent from the following detailed description of the preferred embodiments of the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views:

FIGS. 7A-7C are schematic timing diagrams illustrating information indicative of sensor output over time and corresponding triggering events corresponding to a mode of operation of the control system in accordance with one embodiment of the present invention.

DETAILED DESCRIPTION OF THE INVENTION

Figure 1:
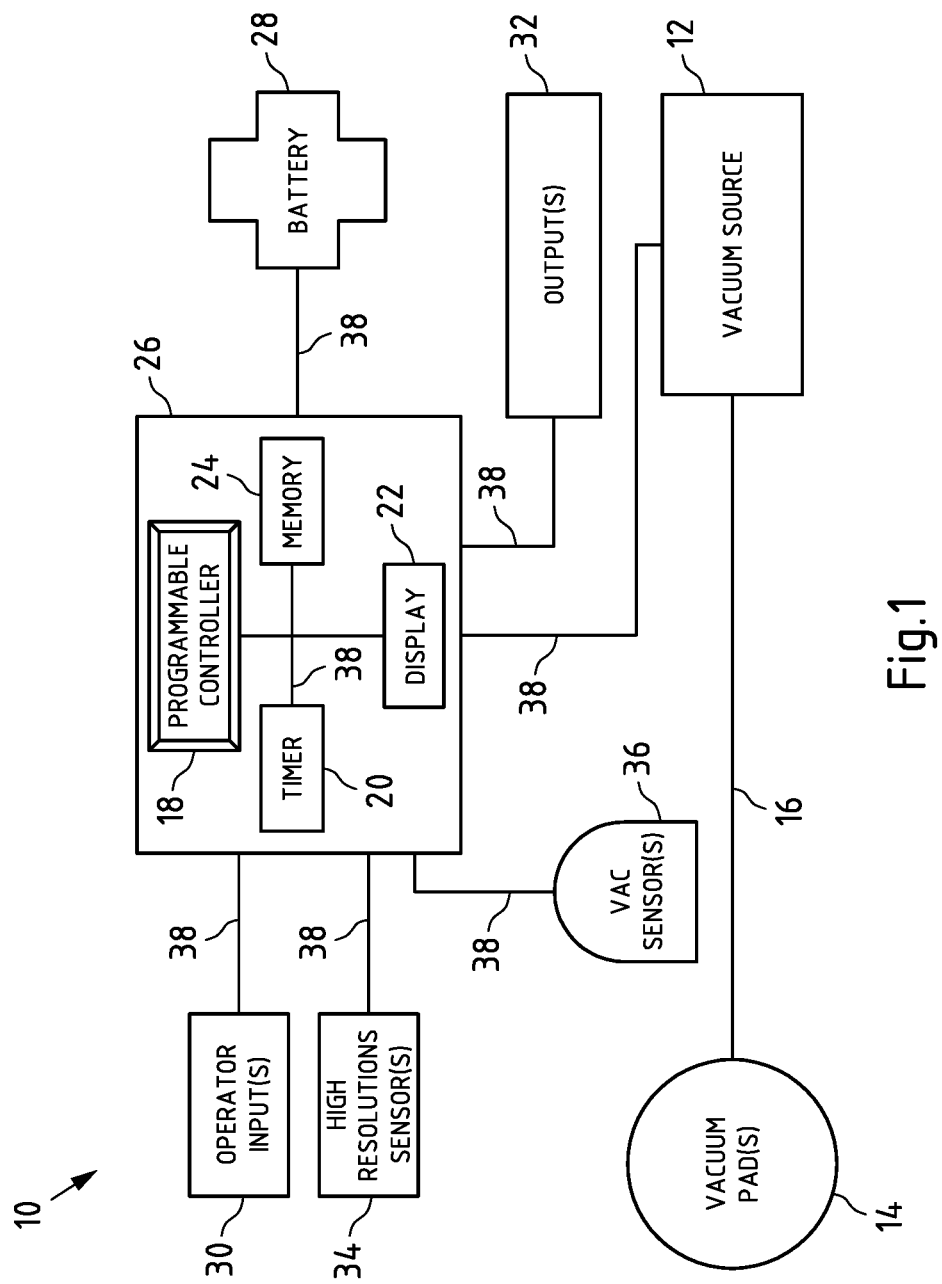
FIG. 1 is a schematic block diagram of a vacuum and control system in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

With reference initially to FIG. 1, a vacuum and vacuum-control system of the present invention is denoted generally by reference numeral 10. System 10 can be used for monitoring and controlling a vacuum attachment device and, according to one embodiment, for monitoring and controlling a vacuum lifter such as a below-the-hook vacuum lifter.

As shown schematically in FIG. 1, system 10 can include a vacuum source 12 and one or more vacuum pads 14. A pneumatic line (i.e., conduit) 16 can connect vacuum pad(s) 14 with vacuum source 12. System 10 can have a programmable or electronic controller 18, which can include a microprocessor. Programmable/electronic controller 18 can include a timer 20, a display 22, and/or memory 24. According to one embodiment, programmable controller 18, including its microprocessor, timer 20, display 22, and/or memory 24 can be located on a circuit board 26 which can be located in a housing (not shown) that can be water resistant or water proof. System 10 can further include a battery 28 for providing power to the system 10, one or more operator inputs 30 that enable an operator to control the system 10, one or more outputs 32 for providing a signal to a component of system 10 or for providing an indication of an event or status related to system 10, a plurality of high resolution sensors 34 as part of high resolution sensing circuits (identified and discussed below) and/or a high resolution vacuum sensor (or sensor circuit) 36 as part of a high resolution vacuum sensing circuit. As shown schematically in FIG. 1, the various components of system 10 can be connected electrically, such as by wires denoted by reference numeral 38.

Figure 2:
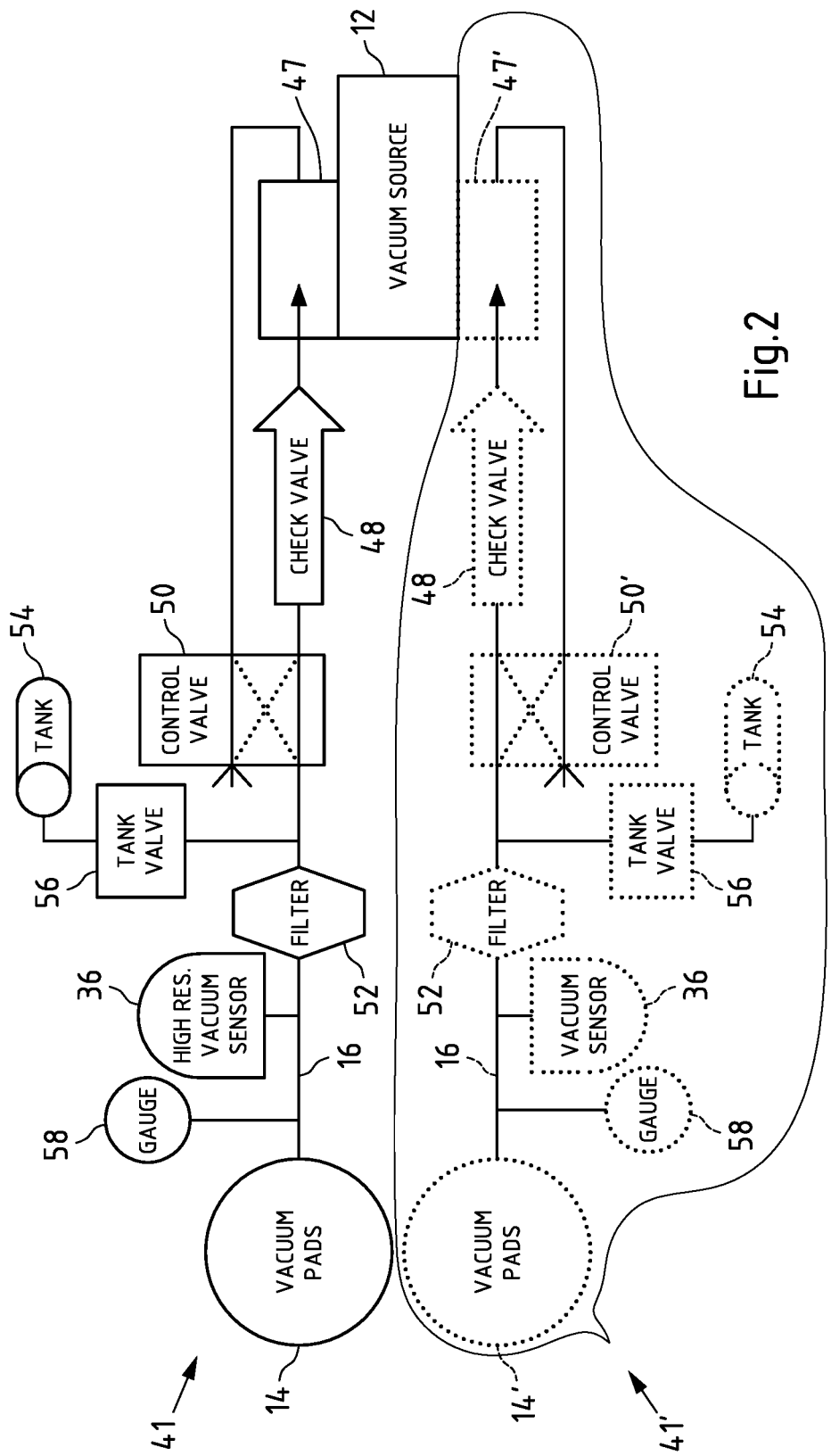
FIG. 2 is a schematic block diagram of a vacuum system in accordance with one embodiment of the present invention.

With reference to FIG. 2, an embodiment of a vacuum system 10 of the present invention is described in greater detail.

System 10, as illustrated in and described with respect to FIG. 1, can include a vacuum source 12, such as the preferred embodiment of an electric vacuum pump, and one or more vacuum pads 14. In particular, system 10 of the present invention may have one, two, or more vacuum pads 14, each part of a corresponding vacuum circuit. In that regard, the combination of components connected by fittings, manifolds, and hoses such that vacuum can readily be transferred between them is known as a "vacuum circuit." A vacuum attachment device, such as a below-the-hook lifter for lifting and moving an object, may have one or more such vacuum circuits. Such independent vacuum circuits may rely on some common components or controls, but will not have an uncontrolled pneumatic connection between them. Multiple vacuum circuits can provide redundancy in the case that other vacuum circuits fail. In the case of a system with two vacuum circuits, each vacuum circuit can be sized to independently provide the entire attachment force needed in case the other circuit fails. As shown schematically in FIG. 2, a vacuum circuit 41 is illustrated and, for the purpose of illustrating a plurality of vacuum circuits, a second vacuum circuit 41' is illustrated with reference numerals 14 and 14' designating vacuum pads (one in each circuit 41, 41') for achieving a vacuum seal with the surface to be attached to, and for providing resistance to slippage against that surface.

The surface area inside the sealing perimeter of the vacuum pad 14 can directly influence the attachment force that will be applied by atmospheric pressure to hold the attachment surface to the vacuum pad. The face of the vacuum pad 14 inside the sealing perimeter can be made of a material designed to have a high coefficient of friction when in contact with the attachment surface in order to resist slipping. This can be especially important when the plane of the attachment is not horizontal, such that gravity applies a force that would tend to cause slippage.

The vacuum pad 14 can be connected (via fittings and hosing 16, and after passing through some other components identified below) to vacuum pump 12 which may be powered by a battery, AC line power, or another power source depending on the application or particular embodiment. According to one embodiment, vacuum pump 12 is powered by the battery 28. Alternately, the vacuum source 3 may be a venturi connected to a source of compressed air (or another gas) in alternative embodiments.

As shown schematically in FIG. 2, a check valve 48 can allow the vacuum source 12 to evacuate the air from under the vacuum pad 14, but can block airflow in the other direction when the pump is stopped, such that the vacuum circuit 41 remains sealed (save for leaks).

A control valve 50 can be used to switch between two states, applying vacuum to the vacuum pad(s) 14, 14' as described above, and releasing the attachment by allowing air to enter the vacuum circuit 41, 41'. When in the releasing state, the vacuum circuit 41, 41' can be vented to the atmosphere or connected to positive pressure such as the exhaust from the vacuum pump 12 that can be used to force air into the vacuum circuit ("blow-off"), causing it to move to atmospheric pressure (no vacuum) more quickly, and after that to become slightly pressurized.

As shown schematically in FIG. 2, a filter 52 can prevent contaminants that might be drawn into the vacuum circuit along with the air drawn from under the vacuum pad(s) from reaching the control valve 50, check valve 48, and vacuum source 12.

Vacuum tank 54 can increase the volume of the vacuum circuit, which can reduce the rate at which the vacuum level drops due to leakage when the vacuum pump is not running. FIG. 2 schematically shows a vacuum tank valve 56, which can be optionally included. When included, vacuum tank valve 56 can be closed when the control valve 50 is switched to the release state in order to preserve the vacuum in the vacuum tank 54. When the control valve 50 is returned to the attach state and the vacuum pad(s) have sealed against the attachment surface, the tank valve 56 can again be opened.

As shown schematically in FIG. 2, a gauge 58 can provide a way for the operator to determine the level of the vacuum in the circuit, even if the power source has failed. This helps enable the operator to evaluate the security of the attachment.

As shown schematically in FIG. 2, a vacuum sensor 36 can measure the precise level of vacuum in the vacuum circuit and communicates that measurement to the programmable controller, which is illustrated in and described below with respect to FIG. 3. Vacuum sensor 36 (such as Cole-Parmer model KIVAC according to one embodiment) and its associated electronics including any analog to digital converters can provide high resolution signals, meaning that it/they can be able to distinguish between even very small changes in the vacuum level in vacuum circuit 41. A vacuum sensing unit may produce a digital output or, additionally or alternatively, may produce an analogue output that is received by an analogue-to-digital (ADC) converter that converts the analogue signal into digital signals that are received by the programmable controller 18. Herein, the use of the term 'high resolution vacuum sensor', 'vacuum level sensor', or just 'vacuum sensor' may commonly refer to the entire sensing circuit including the sensing unit and the associated electronics used to generate the signals read by the programmable controller 18. According to one embodiment, these high resolution vacuum sensing circuits (otherwise referred to as vacuum sensors 36) can have a range of measurement of 0 inHg to 30 inHg, an accuracy in the range of 0.5% of full scale, a precision in the range of 0.1 inHg, and a resolution in the range of 4096 steps in the full scale. Accordingly, high resolution vacuum sensors 36 can be capable of measuring even small changes in vacuum level and are therefore capable of measuring a significant number of vacuum levels. For example, in certain embodiments of the invention, high resolution vacuum sensor 36 has an operating range of 0 inHg to 30 inHg and can measure at least five vacuum levels within that operating range. In certain embodiments of the invention, system 10 can measure at least ten vacuum levels within the operating range. In certain embodiments of the invention, system 10 can measure at least twenty vacuum levels within the operating range. In certain embodiments of the invention, system 10 can measure at least fifty vacuum levels within the operating range. In certain embodiments of the invention, system 10 can measure hundreds of vacuum levels within the operating range of system 10. In certain embodiments of the invention, system 10 can measure at least four thousand vacuum levels within the operating range of system 10. In certain embodiments of the invention, system 10 can measure approximately 4,096 vacuum levels within the operating range of system 10. In certain embodiments of the invention, approximately 32 bit resolution for vacuum measurement is employed, resulting in billions of steps between vacuum level measurements. As described herein, this information can be saved in memory 24 and comparisons of the saved data, computations using the saved data, and/or comparisons between the results of such computations and select information, such as but not limited to desired or required threshold levels, may be made by the microprocessor executing software instructions to perform such computations and comparisons.

Many conventional vacuum lifters can utilize a vacuum tank to increase the volume of the vacuum system. In case of power loss (such that the vacuum pumps are no longer able to run), that increased volume enables the system to maintain sufficient vacuum to hold the load for a longer period of time, increasing safety. Some existing lifters, such as some of those produced by Wood's Powr Grip Co., Inc., additionally insert valves 56 between the vacuum tanks and the rest of the vacuum system. When a load is released, the valve is closed to preserve the vacuum in the tank. Isolating the tank on release can speed the process of releasing the load as no time is required to fill the tank with air. Additionally preserving vacuum in the tank can speed up achieving a secure attachment the next time by eliminating the need for the vacuum pump to evacuate the tank again.

A challenge with such an existing system is to open the tank valve at the optimum time. Unlike the present invention, which utilizes a high-resolution vacuum sensor, prior lifters use available signals in one of the following ways: (i) to open the tank valve upon detection of activation of the operator control to begin attaching; or (ii) open the tank valve only when a safe lifting vacuum level has been achieved, as typically denoted by an indicator. The first approach results in the tank valve being opened too soon, sometimes allowing the vacuum tank to fill with air before the vacuum pad seals against the surface to which it is intended to attach, which then delays achieving the high vacuum levels needed to provide a secure attachment and requires more energy to obtain said vacuum level. The second approach is sub-optimal because it doesn't, until the point that the high vacuum level has been achieved, utilize the vacuum tank to help quickly increase the vacuum level and secure the attachment and when the vacuum level in the tank is less than that under the vacuum pad it can cause a surge of reduced vacuum as it is introduced into the system. Also with the second approach, if the operator starts lifting the load before the tank valve is opened, and the power then fails, the tank will be unable to assist in maintaining the vacuum level needed to hold the load.

In contrast to these prior systems, according to one embodiment, the present invention uses a high-resolution vacuum sensor 36. This high-resolution sensor (sensing circuit) can be capable of detecting the vacuum level in system 10 with sufficient resolution and speed so as to enable the programmable controller 18 to quickly detect the increase in vacuum level which corresponds with the vacuum pads 14 sealing against the attachment surface. When this determination is made, the controller can control an output 32 to open the tank valve 56. Opening the valve 36 at this point in the attachment process can be advantageous as it generally causes the vacuum level at the vacuum pads to increase quickly, providing a secure attachment more quickly than if the tanks had remained out of the system 10 until a later time. Additionally, in some conditions, a load may already be in the air but the tank valve 36 may not yet be open for some reason (such as when the system enters Attach mode due to stiction). In this case, it may not be known whether the tank 54 has already been evacuated or is full of air, so the tank valve 56 is opened in short bursts, optionally observing what the vacuum level does while it is open, and repeating the bursts until the vacuum level in the tank 54 is determined to be nearly equal to or greater than the vacuum in the rest of the vacuum circuit 41, at which time it can be left open for the remainder of the attachment. By initially opening the tank valve 56 for only short bursts, it can be assured that the vacuum level will not drop too far while the tank valve 56 is opened.

An alternate embodiment can incorporate more than two vacuum circuits 41. This can provide redundancy sufficient to maintain the needed attachment force in the case of one vacuum circuit failing without requiring each vacuum circuit 41 that remains operational to be capable of individually providing the entire attachment force. Instead, the remaining operational vacuum circuits must in combination be able to maintain the required force. When there is more than one vacuum circuit, the opening of the tank valves in short bursts is sequenced such that it does not occur in more than one vacuum circuit at a time.

The vacuum source 12 in this illustration can utilize a single electric motor with two pump heads 47, 47', a configuration commonly known as a "dual-head pump." According to such an embodiment, the vacuum circuits 41 are separate (a leak in one will not cause a loss of vacuum in the other) while costs are limited by using a single pump motor. An alternate embodiment can utilize a separate motor for each vacuum pump head. An alternate embodiment can utilize a dual head vacuum pump for each vacuum circuit with the pump heads hosed in parallel to achieve moderate vacuum levels more quickly than when a single pump head is used. An alternate embodiment can utilize a dual head vacuum pump for each vacuum circuit with the pump heads hosed in series to achieve a high vacuum level more quickly or to achieve a higher maximum vacuum level than when a single pump head is used.

An alternate embodiment can utilize two dual head vacuum pumps for each two vacuum circuits with each vacuum circuit being connected to two pump heads hosed in series, the two pump heads being on different vacuum pumps. With both pump motors operating, this configuration can enable achieving a high vacuum level more quickly and achieving a higher maximum vacuum level than when a single pump head is used. Additionally, if one of the pump motors fails, it can enable evacuation of both vacuum circuits using the remaining pump, albeit to a lower vacuum level. This maintaining of vacuum in both vacuum circuits can enhance the security of the attachment.

An alternative embodiment can utilize more than two pump heads for each pump motor. An alternate embodiment can utilize a single vacuum pump or venturi in combination with separate check valves. This can enable a single vacuum source to evacuate multiple vacuum circuits (reducing costs), while the separate check valves prevent the immediate loss of vacuum in both vacuum circuits in the event of a failure in one circuit. An alternate embodiment can utilize a single vacuum pump or venturi in combination with control valves. The control valves can be activated as needed to connect each vacuum circuit to the vacuum source without connecting the circuits together in order to retain isolation.

In some cases it can be important to achieve specific target vacuum levels. This can generally be done by operating the vacuum pump 12 to increase the vacuum level or opening the control valve 50 (with or without the pump running) to decrease the vacuum level. Achieving a specific vacuum level can be useful in applications such as "fragile material mode" (described later) and when performing tests that require a specific vacuum level.

According to one embodiment, each of the pumps and control valves that affect each vacuum circuit (47 and 50 for one circuit, 47' and 50' for the other) can be independently controlled. In this embodiment, the vacuum level for each circuit can be regulated independently as described above without requiring consideration of the effect that each action might have on the other vacuum circuit.

In certain embodiments (further described below), some of the controls can simultaneously affect the vacuum level in more than one circuit. In these embodiments, an innovative method is used to achieve the target vacuum level in each circuit while limiting the deviation of the vacuum level from said target level (such as to avoid damaging material in fragile material mode).

In one such embodiment, the vacuum pump sources for two (or more) vacuum circuits 41, 41' can utilize a common control signal (possibly because they share a pump motor in a dual-head 47, 47' pump or because their pumps have common power supply connections) and therefore are simultaneously activated, while the control valves 50, 50' have separate controls. When the vacuum level in a first circuit needs to be increased to reach the target vacuum level while the vacuum in a second circuit needs to be limited to avoid exceeding an upper threshold, the control valve 50, 50' for said second circuit can be activated to decrease its vacuum level to a lower threshold level. The pumps can then simultaneously activated to increase the vacuum level in both vacuum circuits until one or both circuits reach an upper threshold level. This process can be repeated until the vacuum level for the first vacuum circuit has been increased to the target level. That cycle can be terminated once both vacuum circuits have reached or exceeded the target vacuum level. Finally, the control valves 50, 50' can be used to independently reduce the vacuum level in each circuit to the target level.

Similarly, in an alternate embodiment, the control valves 50, 50' for two (or more) vacuum circuits 41, 41' can utilize a common control signal and therefore can be simultaneously activated, while multiple pumps have separate controls. In this embodiment, if the vacuum level in a first circuit needs to be reduced to reach the target level, the pump for a second circuit can be used to increase its vacuum level to a higher threshold level. The control valves 50, 50' can then be simultaneously opened to reduce the vacuum level in both vacuum circuits 41, 41' until one or both circuits 41, 41' fall below a lower threshold level. This process is repeated until the vacuum level for the first vacuum circuit 41 or 41' has been reduced to the target level. That cycle can be terminated once both vacuum circuits 41, 41' are equal to or below the target vacuum level. Finally, the pumps can be used to independently increase the vacuum level in each circuit to the target level.

Accordingly, as is evident in view of this description, use by system 10 of a high resolution vacuum level sensor 36 can enable near continuous and detailed vacuum monitoring to achieve operational functionality and results in a vacuum lift and control system that were not heretofore possible.

Airflow restriction such as due to a plugged filter 52 (see FIG. 2) can be detected indirectly by observing the output of the vacuum sensor 36 under various conditions. For example, according to one embodiment, the vacuum level may increase more slowly than expected when the airflow is high, but return to increasing at nearly the expected rate when the airflow drops. The rates of these responses can be recorded in memory 24 during a calibration process and used later to detect deviations from the responses obtained when the filter is not plugged.

Similarly a change in airflow restrictions between the vacuum sensor 36 and the face of one or more vacuum pads 14 can be detected when a change is sensed in the vacuum level during known air flow conditions such as when there is no attachment to a surface. The change can be identified by comparing current values to predetermined, calibrated, or historical values that are programmed or stored in memory 24 or alternately compared to readings from other circuits.

In an alternate embodiment, a vacuum sensor 36 is located on both sides of the filter 52 in the vacuum circuit and the differential in vacuum readings between the high resolution vacuum sensors 36 during known air flow conditions can be compared to other values such as those from calibration, historical, or established criteria stored in the memory 24 to determine if the filter 52 is restricting the airflow more than recommended.

Figure 3:
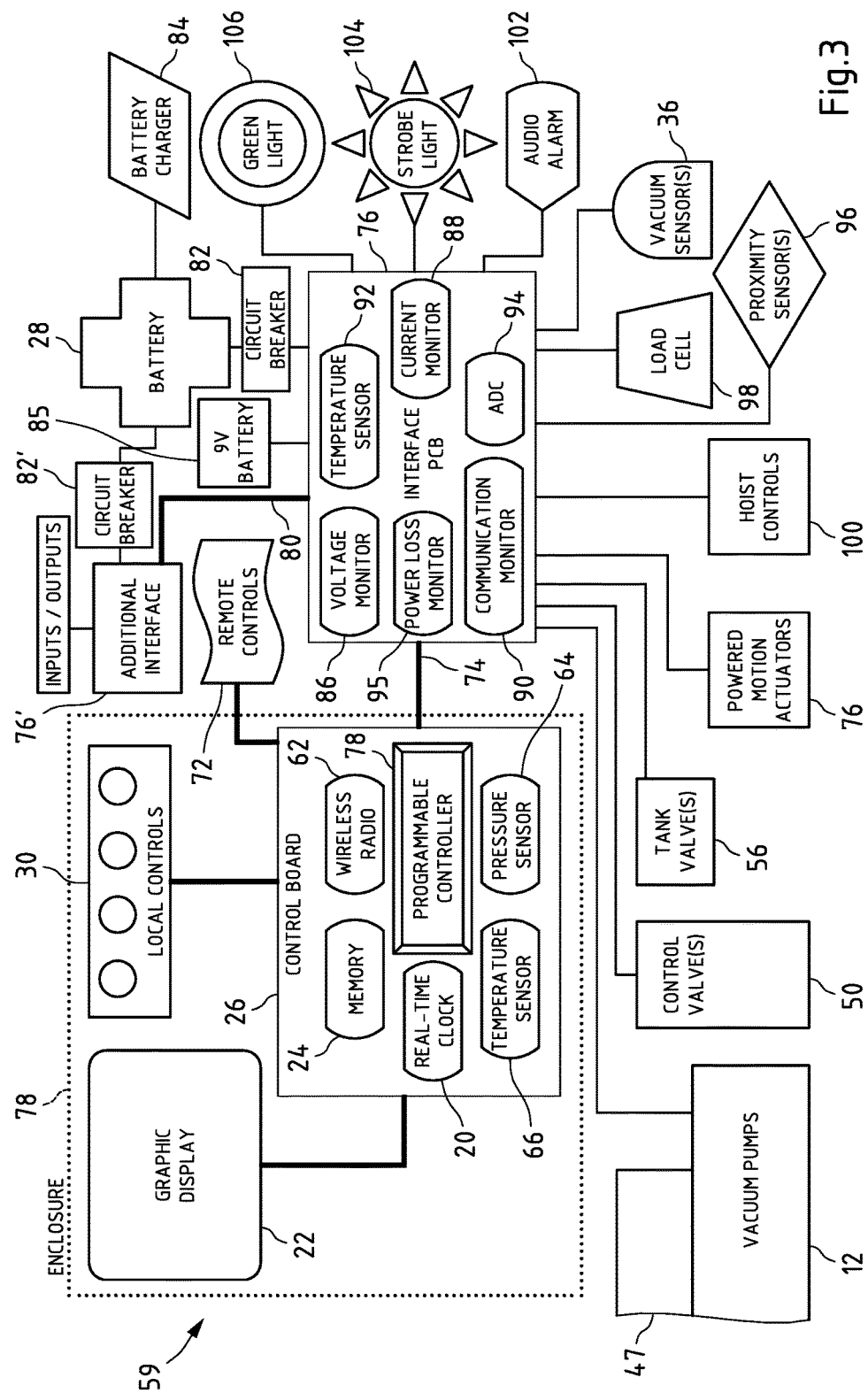
FIG. 3 is a schematic block diagram of a vacuum control system for controlling a vacuum system in accordance with one embodiment of the present invention.

With reference to FIG. 3, a control system 59 for controlling the vacuum system 41 illustrated in and described with respect to FIG. 2 is illustrated and described.

FIG. 3 schematically illustrates the architecture of the control system 59, denoted generally by reference numeral 59, according to one embodiment, used in combination with the vacuum system 41 described in FIG. 2. The connections of control system 59 can be generally electrical, rather than pneumatic as schematically shown in FIG. 2.

As schematically shown in FIG. 3, the control board 26 can comprise a number of sub-components (described below).

The programmable controller 18 in combination with the other sub-components of the control board 26 can implement a variety of software algorithms which can be used to control the operation of the vacuum attachment device, its interface, and its interaction with other devices it communicates with as detailed below.

The wireless radio 62 in the control board 26 can comprise a radio transmitter and receiver which are interfaced to the programmable controller. The transmitter and receiver may be integrated into a single electronic device or module. The communication protocol may include Bluetooth, Wi-Fi, NFC, cellular data, or other protocols and/or networks. The wireless radio 62 in the control board 26 can be used to establish communication between the control boards 26 in one or more other vacuum attachment devices and/or with cell phones, tablets, laptops, or other electronic devices, and/or with cellular or other network data providers (either directly or through gateways).

The programmable controller 18 can implement a software program for utilizing the wireless radio 62 to discover other control boards (not shown and, in particular, being control boards of other vacuum attachment devices). According to one embodiment, if requested by an operator and permitted by an operator of each vacuum attachment device, the programmable controllers 18 of each vacuum attachment device can exchange uniquely identifying information to enable authentication of the other programmable controllers and begin cooperative operation.

The wireless radio 62 can be used to send warnings to compatible devices. For example, smartphones with Bluetooth or Wi-Fi can receive these messages and provide audible, visual, and vibrating warnings.

Additionally, the wireless radio 62 can be used to communicate information about the operating performance of the vacuum attachment device to a communicating device such as a smartphone, tablet, or laptop, which can then display, analyze and/or transmit said information. Such a transmission might send said information to the operator, owner and/or manufacturer of the vacuum attachment device or another location accessible by them. The information thus sent may be helpful in monitoring, tracking, and troubleshooting the vacuum attachment device. Additionally, as stated, in certain embodiments, the wireless radio 62 may be used to receive remote control communications, such as commands received from an authorized and authenticated remote electronic device, such as another remote programmable controller, a mobile communications device, or a remote computing station.

The wireless radio 62 may communicate in a one-to-one fashion as with paired Bluetooth or in a one-to-many (broadcast or multicast) fashion.

The pressure sensor 64 can provide a measurement of the atmospheric pressure (which impacted by altitude and weather) and can be relevant for estimating the vacuum level that can be achieved and therefore the amount of attachment force that can be expected.

The temperature sensor 66 can measure temperature which can be utilized for determining whether the vacuum attachment device (i.e., the lifter) is inside of the specified operating temperature range, adjusting the estimated sliding resistance of the vacuum pads (rubber gets harder when cold), and adjusting the expected performance of the battery.

The real-time clock 20 can supplement the timekeeping functions built into the programmable controller (CPU) with a clock that continues to keep time even when power to the vacuum attachment device is turned off.

Several types of memory 24 can be available to, or integrated into, the programmable controller including CPU registers, RAM, EEPROM and FLASH. The various types of memory can be used by the programmable controller for multiple purposes including maintaining: state information, past values read from the sensors and inputs, configuration and calibration results, logs of user inputs and system responses, and for storing execution instructions for the programmable controller. Some memory can retain the stored values even when the power is disconnected.

The output from the real-time clock 20 can be used in combination with records stored in memory 24 to provide reminders of when maintenance is required. Logged information stored in memory can be timestamped using time information obtained from the real-time clock 20. That logged information surrounding undesirable or non-typical operation can be stored for extended periods of time so that it can be recalled to evaluate the conditions surrounding a failure or accident.

The control board 26 can be integrated with or connected to local controls 30 which can be a means for an operator to provide input to the control board. Such input may communicate the intent of the operator to change the system state into attach/release/standby, to power up or down, etc.

The remote controls 72 can provide an alternate means for accepting operator input from a control pendant, radio remote control, or other remotely located controls. The local controls 30 or remote controls 72 can be used by the operator to complete a login process whereby the operator is identified. The functions accessible to said operator may be restricted, including preventing attachment. Such restrictions can be used to ensure that only operators with proper training and/or certification are able to begin operation.

One embodiment of the remote controls 72 utilizes an external remote control receiver, such as an HBC Radiomatic model Quadrix FSE 511). An alternate embodiment can utilize the wireless receiver of the wireless radio 62 to receive remote control commands.

The graphic display 22 can provide visual feedback to the operator about the operating state, battery condition, warning messages, maintenance reminders, operator login requirements, etc.

The control board 26 can be connected via a multi-conductor (CAT-5/6) cable 74 to the interface PCB 76. While not essential to the primary function, there can be benefits for separating the electrical circuitry in this way including (i) easier wiring, as the control board 26 can be located so as to be easily accessible to the operator while the interface PCB 76 can be located in closer proximity to the components it is connected to. An inexpensive CAT-5/6 cable can be used to connect them; and (ii) the control board 26, local controls 30 and graphic display 22 can be integrated into a water-tight enclosure 78, with a minimum of enclosure penetrations. The interface PCB 76, with its many electrical connections can be protected in a similar or an alternate way, including one or more of conformal coating, potting/encapsulating, use of sealants, use of closed cell foam, sealing wire penetrations between layers of foam, rubber or other elastic material.

An alternate embodiment can combine the sub-components of the control board 26 and interface PCB 76 into a single unit. Another alternate embodiment can partition the sub-components of the control board 26 and interface PCB 76 into separate units with a different selection of said sub-components being incorporated into each one. Further interface PCB 76' can be connected to the first interface PCB 76 in daisy-chain fashion using additional connecting cables 8. In an alternative embodiment, rather than a daisy chain, multiple interface PCBs 76, 76' can be connected in to a hub device or "Y" cable harness to enable the control board 26 to communicate with a number of interface PCBs.

Similarly, additional control boards can be connected to either end of the daisy-chain of interface PCBs or through a hub device or "Y" cable in order to form a control system 59 with multiple sets of local controls 30 and/or remote controls 72. This can be used to enable multiple vacuum attachment devices which are normally operated independently to be joined into a combined system for cooperative operation.

The cable 74 connecting the control board 26 and interface PCB(s) 76 in combination with the supporting circuitry can have several function and characteristics including (i) providing power to the control board; (ii) providing a path for draining charge induced to the control board or its attachments through ESD (electrostatic discharge); (iii) assigning I2C addresses to connected interface PCBs 76, 76' using a protocol wherein the addressing data is sent using a data and clock line where the data is delayed in each daisy-chained interface PCB 76 by a number of clock pulses. The shifted data can be used to assign unique I2C addresses to each daisy-chained interface PCB 76, 76'; and (iv) supporting bidirectional I2C communications between the control board 26 and some or all of the connected interface PCBs 76, 76'.

Various signaling methods, such as use of a CAN bus, can be employed by system 10 of the present invention.

The programmable controller 18 can monitor the success or failure of each I2C communication in order to determine the validity of the results. After each reading from the interface PCB 76, it can cause another test bus transaction. According to one embodiment, only if both the original and following test transaction are completed successfully are the results of the original reading utilized in the control algorithms. This can provide a measure of protection against communication errors caused for example by a faulty cable 74.

Providing an electrical connection for the control board 26 to power a portion of the circuits on the interface PCB 76 when the power button on the local controls 30 is pressed can enable a staged power up sequence on the interface PCB 76 which can enable setting up the interfaces therein before power is supplied to other portions of the circuits. This signal can also be used to power up other connected control boards 26, such that the power needs to be turned on for only one in order to power up all of them.

This same electrical signal, which can be powered only while the momentary power button is pressed, can also be used to enable powering down both connected interface PCBs and controls boards. It is not under software control; it can be activated only by the operator pressing a momentary button. This can prevent the interface PCB 76 from powering down in the event of a software problem, ensuring that the communication monitor 90 can activate the fail-safe mode.

To improve the reliability of communications between the control board 26 and interface PCBs 76, a reference voltage level for signaling can be established (I2C bus and address assignment) that is separate from battery ground. In combination with supporting circuitry in each interface PCB 76, 76', this separate signaling reference can provide multiple benefits, such as: (i) improving the signal margins under conditions where the interface PCBs 76, 76' may have different amounts of voltage drop in their connection back to the battery; and (ii) preventing damage to the interface PCBs 76, 76' in the event that another connected interface PCB 76, 76' has its power connections reversed; and (iii) preventing damage to the connecting cable 80 in the event that one of the interface PCBs 76, 76' has a poor or absent connection to the battery's ground. Series resistors on some signals limit the amount of current that can be sourced or sunk to prevent damage in case of accidental connection to 12V or ground.

The cable 74 and/or cable 80 and/or wireless radio 62 can be used to transfer operating instructions such as firmware for the programmable controller, operational settings, logged data and other information from the control board 26.

If system performance factors indicate that operation at the rated load is not allowed to retain the intended design factor, but that continued operation is possible with a reduced load rating, the operator can be given opportunity to authorize such derated operation using the operator controls. This may occur, for example, at high elevations where the relatively low atmospheric pressure limits the vacuum level that can be achieved.

Several factors are considered to determine whether the failure to reach high vacuum is due to elevation, leaks, or some other factor. Leak rate detection may be performed by turning the pump off and monitoring the rate of decline in the vacuum level. If the limitation in reaching high vacuum is determined to be significantly due to leaks, the operator may be prompted to fix the leak rather than being offered an opportunity to switch to high-elevation mode.

If a reduced vacuum threshold is established and authorized by the user, the green light 106 may be flashed in a pattern that correlates to the reduction in capacity. For example if a 20% decrease in maximum capacity is authorized, it may flash with 2 pulses every several seconds.

The operator may select a "fragile materials" mode in which load rating is reduced and the vacuum levels are intentionally limited. Such selection may require the operator to enter a code or otherwise authenticate themselves and confirm their intention to operate with a derated capacity.

The operator may select (or the system may default to) a "high-vacuum mode" in which the vacuum level is maintained at a higher level than is necessary to achieve the rated load. This can provide additional protection against inadvertent detachment or means to compensate for other factors like reduced coefficient of friction or alternate but smaller vacuum pads. This mode may be enabled by and the maintained vacuum level controlled by measurements of the actual vacuum levels achieved, by measurements of the atmospheric pressure, or by other means.

As stated, the programmable controller 18 can implement software algorithms to facilitate cooperative operation with other programmable controllers with which it can communicate via the wireless radio 62 or via a cable 80 connection or via some other means.

Such cooperative operation may include:

(i) Activating the attach function or entering the corresponding system state on one programmable controller 18 causes the cooperating control boards to do the same. This can enable an operator to activate said attach function on multiple vacuum attachment devices using only the local 30 or remote controls 72 for one of the cooperating control boards;

(ii) Said activation of the attach function may be conditional upon all of the cooperating control boards allowing it. If conditions are contrary to beginning an attachment on any of the control boards, attachment functionality can be blocked on all of them. Conditions that may prevent attachment may include inadequate battery 28 charge, missing or 9V power loss battery 85, vacuum sensor 36 readings outside of anticipated range, disconnected components or malfunctions sensed by too much or too little current draw from a component on any of the systems.

(iii) Activating the release function or entering the corresponding system state can be blocked if the attach operator control is activated on any cooperating control board.

(iv) The green "lift" light 106 that indicates that it is safe to lift will not activate on any cooperating unit unless the criteria for doing so are present on all of the cooperating programmable controllers.

(v) Warnings detected on any of the cooperating units can be output on all of them to maximize the chances of the operator or bystanders noticing them.

(vi) The battery gauge readings on each of the cooperating units can be communicated between them. Each graphic display 22 can show the battery level for the battery it is (indirectly, through the cable 74) powered by and the battery level of the cooperating unit with the lowest battery level and an identification of which unit that is. This can enable the operator to determine whether continued operation is possible before charging each battery 28.

(vii) If communication between the cooperating units is lost, they continue to operate independently but warn the operator of the change, optionally requiring an acknowledgement input by the operator.

(viii) Turning on the power on one vacuum attachment device can power up the others.

(ix) Turning off the power on one vacuum attachment device can power off the others.

(x) When the lifting device is powered up, the controls system can check to see if it can communicate with the other controls it was last known to be cooperating with, or any others. If there are any changes, it can require acknowledgement of the change by the operator. A unique ID can be used to specifically identify each programmable controller 18.

The enclosure 78 can protect certain components and, in particular those located therein, from the environment. It can include a transparent window for viewing the graphic display 22 and can be at least partially made of a material through which the wireless radio 62 can communicate.

The interface PCB 76 can be connected through a circuit breaker 82 to a 12V lead acid battery 28. Alternate embodiments can utilize different battery chemistries (such as LiFe) and/or different battery voltages (such as 24V or 48V).

The circuit breaker 82 can prevent excessive current draw from the battery in case of a fault, protecting the wiring and interface PCB components. The circuit breaker can self-reset after an overload fault causes it to disconnect.

A battery charger 84 can be powered by line voltage enables charging of battery 28. An alternate embodiment can utilize a power supply in place of the battery 28 and battery charger 84. It can be suitable for applications in which line voltage to power the power supply is continuously available. Another alternate embodiment can utilize a fuel cell in place of the battery 28 and battery charger 84.

As illustrated in FIG. 3, each interface PCB 76, 76' can have a separate associated circuit breaker 82, 82' and connection to the battery or a splitting point connected to it.

The interface PCB 76 can incorporate or can be interfaced to a variety of sub-components. The voltage monitor 86 can provide a measurement of the voltage input to the interface PCB 76, which is closely related to the battery voltage (reduced by the voltage drop in the circuit breaker and the wiring between the battery 28 and the interface PCB 76). A separate voltage monitor can provide a measurement of the voltage difference between the battery's ground connection and the signaling reference in the CAT-5 cable (described previously). The current monitor 88 can measure the current entering the interface PCB 76 through its power connection to the battery. The current measurement can be used for multiple purposes. In particular, if the current being drawn from the battery 28 exceeds a threshold, said threshold being based on the current rating of the circuit breaker 82 and/or based on the expected current consumption of the interface PCB 76 (including the current supplied to the control board 26 through the cable 74 and to other connected components) under the current operating conditions and/or the maximum current the interface PCB is able to sustain before damage, the system can attempt to protect itself by turning off the power supply to interfaced components including one or more vacuum pumps 12, control valves 50, tank valves 56 and outputs used to control powered motion actuators 71. By thus performing the action of turning off the power supplied to one or more components, the current drawn from the battery can be reduced to a more desirable level.

By considering the reduction in current draw as each component's power supply is turned off, the contribution of said component to the overall current draw can be determined. Some components may incorporate a sense output allowing for their contribution to the current load on the battery to be determined directly while still operating. If the current draw of said component is determined to be greater than expected, it may be determined that there is a fault in the associated component causing a warning notification to be presented to the operator.

A software program using as input data one or more of (i) the measured contribution of each component to the total current draw, (ii) the expected contribution of each component, (iii) the priority of keeping each output operational (i.e., it may be a higher priority to operate a vacuum pump in order to maintain a secure attachment than it is to operate a powered motion actuator), and (iv) time (such as to model the expected time before the circuit breaker opens under the measured current draw) may attempt turning back on the power supply to certain components in order to restore at least partial functionality and/or to determine if the fault that caused excessive current draw still exists.

In this way the combination of the output of said algorithm and control over the power supply to the various system components can serve to provide over-current protection similar to that which would be provided by individual circuit breakers on each said power supply control circuit, with the advantage of intelligently selecting which such control circuits to retry and the timing for doing so.

The readings from the voltage monitor 86 and current monitor 88 can be used to determine if the battery charger 84 is functioning correctly.

The output drivers incorporated into the interface PCB 76 and used to supply power to the connected vacuum pumps 12, control valves 50, etc. can be protected from overload (such as being shorted to ground) by self-resetting protective devices including PTC fuses and self-protecting MOSFET drivers.

The measurements provided by the voltage monitor 86 and current monitor 88 on each interface PCB 76 connected to the same battery can be evaluated over time and incorporating the temperature as measured by temperature sensors 66 and 92 used as input to algorithms implemented in the programmable controller 18 to determine the state of the battery 28. The state of the battery 28 includes its current state of charge as well as its ability to perform relative to a new battery.

The state of charge may be determined in part by measuring the voltage the battery 28 is able to maintain while delivering a particular amount of current. The state of charge can be combined with an estimate of the rate of energy usage during operation to provide an estimate of the time remaining before the battery needs to be charged. The need for replacement can be determined in part by calculating the battery's internal series resistance using measurements of the voltage change as the amount of current being drawn from the battery 28 changes. The state of the battery 28, including its internal series resistance can be used to build an algorithmic model of the battery 28, which can then be used to predict the voltage the battery 28 will be able to deliver under potential future conditions.

If the battery state is determined to be such that it may be unable to supply the power needed to continue operation of the vacuum lifter with an acceptable level of margin, the programmable controller 18 may "lock out" entering the "Attach" operational state described herein, thereby reducing the risk of being unable to maintain the attachment.

At one or more times such as, for example, upon power up of system 10, system 10 can determine if the vacuum pad 14, 14' are currently attached to a surface. First, programmable controller 18 can determine if the output from the vacuum sensor 36 indicates a higher level of vacuum than expected when unattached or a pattern of vacuum level change that would be expected when attached or partially attached. This determination can be made by comparing currently sensed vacuum levels with one or more known vacuum levels indicative of an unattached state (or an attached stated) and/or by comparing a rate of change of vacuum level with known characteristics indicative of an unattached state (or an attached state) to form a conclusion as to whether the attachment device is attached to an object. Secondly, as system 10 operates, system 10 can update a value stored in EEPROM memory (which maintains stored values without power) to represent whether a load is attached or not. On power up (such as when power is restored after an unplanned loss of power), the stored value can be read to determine if a load was attached when power was lost. If so, the conservative assumption can be made that the load is still attached.

If either method described above indicates that a load is attached, the system can be forced into the attach state (in which it attempts to maintain a secure attachment). If the attachment is to a load suspended in the air, this can minimize the chances of that load being dropped.

Also, if the programmable controller 18 acknowledges that a load is attached, the normal shutdown process triggered by the operator controls can be prevented, and if shutdown is attempted, both visible and audible warnings can be presented to the operator to inform them as to the reason for the lock out. In an alternate embodiment, the lock out can be overcome by the operator confirming their intent to power down, such as by continuing to hold for an extended period of time the buttons that cause powering down. In an alternate embodiment, the operator may be required to enter their operator login to initiate the override.

Indications that a load may be attached may occur in circumstances including the restoration of power after a momentary loss of power during an attachment. Indications that a load may be attached may also occur when the vacuum attachment device while in standby mode is forcefully pulled away from a surface. In that event, the surface sometimes sticks to the vacuum pads in spite of the fact that the vacuum attachment device is not actively creating vacuum; this phenomenon is called "stiction" elsewhere in this document. This can occur because vacuum pad 14 has an elastic sealing edge and maintains a seal even as it is pulled slightly away from the load. This increase in distance can increase the volume of the space under the vacuum pad 14 and creates a vacuum. This vacuum tends to hold the load to the vacuum pad, and can cause the load to be lifted. If the system remains in standby mode, this vacuum will eventually be diminished due to leaks and the load will be dropped. By automatically switching into attach mode when this condition is detected, the vacuum level can be increased to achieve a secure attachment.

During the time between when the system state is thus switched into attach and when a vacuum level sufficient for a secure attachment is reached, audible and visual alarms can notify the operator that additional caution is warranted.

If an attachment is detected as described above, the switching into the attach system state may bypass some of the steps in the normal preparation and operation sequences. Specifically, operator login, applying load tests to facilitate battery level evaluation, and self-tests may be bypassed, as maintaining the existing attachment can take priority over determining whether an attachment should be allowed at all. Once the attachment has ended (the load has been released), the normal preparation and operation sequences will resume as relevant.

The operator controls for releasing an attachment typically have a momentary effect, with the system state thereafter transitioning to standby or back to attach (if the load is determined to still be attached as described above). As a special case, a particular combination and/or sequence of input using the operator controls can activate a latched release function for a period of time. During this time, detection of the attachment does not need to cause a transition to attach mode, making it easier for the operator to release the attachment. Also during this time, the pump 12 and control valve 50 may be controlled so as to actively force air into the vacuum circuit and thereby more quickly reduce the attachment force.

According to one embodiment as schematically shown in FIG. 3, control system 59 can incorporate control signals to control powered motion actuators 71. Motion actuators 71 can draw only a small amount of the current necessary for their operation from their connections to the interface PCB 76, as those connections are used as control signals for switching a larger amount of current which is obtained from a separate connection to the battery 28. As such, the current monitor 88 can be unable to directly measure the current consumption of said larger currents such as for powered motion motors.

The current consumption of powered motion motors can be highly dependent upon the amount of force they have to apply to achieve the commanded motion and may be large relative to the current consumption of other system components such as the vacuum pumps 12. The current draw during powered motion may be estimated based on the amount the battery voltage drops when they are activated. Their maximum expected current draw may be stored in memory 24 accessible to or integrated into the programmable controller 18, with the stored value being determined by testing or based on the specifications of the powered motion motor as may be indicated on its nameplate.

A software program can be utilized which can incorporate the algorithmic model of the battery described previously, the state of the battery 28 described previously, and the stored value representing the maximum expected current draw of the powered motions to determine if the battery will be able to maintain a minimum threshold voltage while supplying the current which may be needed for the powered motion if they are actuated by the user.

The output of said software program can be used to (i) adjust the level displayed on a battery gauge shown on the graphic display 22, (ii) provide warnings to the operator if the battery state does not meet certain criteria, and/or (iii) "lock out" the initiation of a new attachment.

If the activation of a powered motion actuator 71 is anticipated to (based on the battery model described above) or actually found to (such as measured by the voltage monitor 86) cause the battery voltage to drop unacceptably (to a voltage that could potentially prevent the vacuum pumps 12 from starting/running), the activation of the motion actuator 71 may be blocked.

According to one embodiment, this software program or an additional software program may additionally consider other criteria including the vacuum level as measured by the vacuum level sensors 36 and whether the vacuum pump(s) 12 are currently being powered in order to permit the powered motion actuator 71 to be activated if the resulting battery voltage drop will not prevent maintaining a threshold vacuum level.

This software program or an additional software program may additionally alternate between supplying power to the power motion actuator 71 and one or more vacuum pumps 12 or other system components. This alternation can prevent overloading the battery while providing both the vacuum pumps 12 and motion actuator 71 opportunities to operate for a period of time. Providing such opportunities for the actuator may enable the operator to orient the attached object in such a way that it can be secured while the battery 28 is charged or replaced.

When any abnormal condition including continuously or intermittently blocking the activation of a powered motion actuator 71 occurs, an operator message can be generated.

When the embodiment incorporates multiple power motion actuators 71, it may prevent the simultaneous activation of more than one using a fixed priority assignment or by blocking attempted activations if another actuator 15 is currently activated.

Operator messages may be communicated in various ways including any combination of:
(i) audible alarms 102;
(ii) turning the green light 106 on or off;
(iii) turning the strobe light 14 on or off;
(iv) displaying messages on the graphic display 22; and/or
(v) sending messages through the wireless radio 62.

Operator messages may be communicated in different ways depending on the importance or urgency of the operator and/or bystanders being notified. For example:

The buzzer 102 and strobe light 104 can be turned on, the green light 106 can be turned off, urgent messages can be displayed on the graphic display 22, and/or warning messages can be sent through the wireless radio 62 when there is a power failure, unexpected loss of vacuum, or other condition that might indicate an imminent failure of the vacuum attachment.

A less urgent message could indicate that the 9V battery 85 is getting low and should be replaced (or is absent).

If while in the attach system state, and after the vacuum level indicates that the vacuum pads have sealed, if the vacuum level does not increase quickly enough or does not reach a high enough level, the operator can be notified.

An algorithm executing in the programmable controller 18 can utilize the output from the vacuum sensor 36 and the passing of time to evaluate the leak rate. If the leak rate exceeds any of a number of thresholds, the operator can be warned with an urgency corresponding to the threshold that has been exceeded. Additionally, the leak rate may be displayed on the graphic display 22. An approximate evaluation can be performed quickly to provide feedback to the operator of undesirable conditions before the load is lifted. This evaluation can continue to become more accurate as more time and data can be incorporated into the evaluation.

According to one embodiment, a temperature sensor 92 incorporated onto the interface PCB 76 supplements the temperature sensor 66 on the control board 26. Being able to measure the temperature in both locations can provide information relevant to their locations. Sensor 92 can provide a measure of the ambient temperature the output drivers on the interface PCB 76 are operating in, which can affect the amount of current they can deliver before going into self-protection mode.

An analog to digital converter (ADC) 94 can measure voltages related to various input signals (such as vacuum sensors 36) and can make those readings available to the programmable controller 18 through cable 74 using the I2C communication protocol. The resolution of the ADC is one of several factors that can directly impact the ability to read small changes in levels. While 4 or 8 bits may be satisfactory for many functions, a 12, 16, 24, 32 bit or even greater resolution can be used in various embodiments.

The communication monitor 90 can evaluate whether the control board 26 and interface PCB 76 are communicating successfully. A timer can be restarted each time a particular communication is completed. The programmable controller 18 can initiate such a communication periodically. If the period of time between such communications exceeds a time threshold, it can institute a fail-safe mode, in which the risk of the vacuum attachment devices detaching is reduced and the operator and bystanders are warned. Specifically, while said fail-safe mode is active, the pumps 12 are turned on, the control valves 50 are closed (so as to cause the vacuum level to increase), the audible alarm 102 and strobe light 104 are activated, the green light 106 is turned off, and the powered motion actuators 71 are turned off.

This communication monitor 90 can thus protect against all potential causes of failure in communications, including failure of the cable connection 74 and failure of the programmable controller 18.

The programmable controller 18 can periodically monitor the state of the communication monitor 90 to determine if it is in fail-safe mode or not. If so, it can generate additional warnings, including messages on the graphic display 22 and transmissions through the wireless radio 62. It can also force other connected or cooperating interface PCBs 76' with which it may still be able to communicate to take actions similar to those instituted by the described fail-safe mode.

A transition from fail-safe mode back to normal operation may occur when communications are re-established such that the criteria evaluated by the communication monitor 90 are satisfied. During this transition, additional actions may be taken by the programmable controller 18 to ensure that the components of the interface PCB(s) with which communication has been restored are correctly configured.

The output drivers, mounted on the interface PCB 76, can be under control of the programmable controller 18 and communication monitor 90. They can switch the power needed to power the vacuum pumps 12, control valves 50, and other outputs. They can be protected using various protective devices including circuit breakers, self-resetting (PTC) fuses, and load drivers with built-in overload protection utilizing current limiting and/or thermal limiting.

The power loss monitor 95 can warn the operator and bystanders if power from the main battery 28 fails during operation of the vacuum attachment device. It utilizes power from the 9V battery 85 to activate the audio alarm 102 and strobe light 104.

According to one embodiment, when the vacuum attachment device is in attach mode and achieves a minimum attachment vacuum level on all vacuum circuits, the green light 106 can be turned on to indicate that the attachment is secure.

Proximity sensors 96 may be used to enable feedback to help position the lifter with regard to a load, provide notification of surrounding collisions and/or hazardous operator positions and placement of hands.

A load cell 98 can be mechanically connected to or incorporated into the vacuum attachment device in such a way as to measure the force being applied by the vacuum attachment device to the surface it is attached to. Said load cell 98 can be connected to the interface PCB 76 in such a way that the programmable controller 18 can determine that force.

In an alternate embodiment, one or more strain gauges are used to indicate the load on structural members of the vacuum attachment device, thereby providing an indirect measurement of the force being applied to that member and enabling the calculation of the force being applied to the attached surface.

In either case, if the force being applied to the attached surface exceeds a threshold, warning messages can be generated for the operator. Furthermore, if the force between being applied to the attachment surface is being applied using a winch, crane or hoist, the hoist controls 100 for such can be disabled to prevent the application of greater forces.

As described above, vacuum level sensor 36 can provide a measurement of the vacuum level in each vacuum circuit 41. The vacuum level can be measured relative to atmospheric pressure. The vacuum level can be measured with a resolution sufficient to distinguish between many vacuum levels, thereby making it possible for the programmable controller 18 to determine the rate at which the vacuum level is increasing or decreasing.

The readings from such high-resolution sensors (including vacuum, voltage, current, and other sensors) can be averaged over an integer multiple of 1/60 and/or 1/50 second (such as 1/10 second) to make coupled power noise average to zero in locations where the line power frequency is 60 Hz or 50 Hz.

The audio alarm 102 (buzzer) can be used both to provide non-critical indications, acknowledgements and warnings (short beeps) as well as notification of higher-priority warning warnings (repeating or continuous beeping). A warble tone may be used instead of a tone of constant frequency to make it more perceivable.

The strobe light 104 can also be used to provide a warning indication to the operator and bystanders. It can be visible from a large distance away and noticeable even in a noisy environment. One of the conditions it indicates can be possible imminent detachment, as triggered by the operator activating the release function.

The programmable controller 18 can implement a combination of cooperating algorithms for controlling the vacuum pump 12 and control valve 50 in order to cause the pump to run and evacuate the air from a vacuum circuit when certain criteria are met, and to turn the pump off when another set of criteria are met. These algorithms can enable the system to maintain the minimum vacuum level necessary to maintain a secure attachment while optimizing other factors including minimizing the load on the battery, compensating for elevation, considering the operator's perception of the leak rate, load testing the battery, and other factors, some of which are detailed below.

When the vacuum attachment device is in attach mode, it is generally not necessary for the pump on a specific vacuum circuit to run continuously in order to maintain a minimum attachment vacuum level sufficient to apply the necessary attachment force. Instead the pump can be turned on when the vacuum level drops to said minimum level and turned off at some higher vacuum level.

Prior implementations turn the pumps off immediately when an upper threshold vacuum level is reached. By contrast, system 10 of the present invention does not immediately turn the pump off when the upper threshold is crossed, but instead utilizes a timer to determine when the vacuum level has been continuously above that threshold for a period of time, turning the pump off only after that time. This technique in combination with setting the upper threshold to a lower vacuum level that can be achievable even at high elevations automatically provides optimal performance without requiring burdensome and error-prone manual adjustments to the upper threshold as was necessary with prior implementations. Specifically, it can automatically achieve both of these objectives: (i) reaching high vacuum levels before turning the pump off (when conditions permit) to maximize the time before the vacuum level leaks down to the lower threshold and the pump needs to run again, and (ii) ensuring that the pump will turn off automatically even under conditions where high vacuum levels are not attainable (such as at high elevations).

Accordingly, the present invention can provides a criteria for turning the pump off even if a second higher threshold is not reached, such as might occur at higher elevations, or when the vacuum pump is worn. In those cases, a traditional system with a lower "safe to lift"-type threshold and a higher "turn the pump off"-type threshold might reach the lower threshold, but never reach the upper threshold, resulting in the vacuum pump running continuously and draining the battery unnecessarily. Accordingly, system 10 of the present invention can enable the vacuum pump to turn off even if the maximum vacuum level reached is only marginally above the lower threshold. In prior implementations, one method for addressing the issue of pumps not turning off was to lower the upper threshold. An advantage of use of a timer in system 10 is that it can provide good hysteresis (to avoid rapid cycling) when possible without requiring manual adjustment when high vacuum levels are not obtainable.

Additionally, using a barometric pressure sensor to sense barometric pressure, system 10 can compare the maximum vacuum with the vacuum that would be expected at the sensed barometric pressure. The result of that comparison is indicative of the condition of the vacuum pump and can be useful to indicate when a pump is worn and in need of repair or replacement.

When power is applied to a vacuum pump 12, the electrical current drawn from the battery typically surges for a short time while the motor is started. When the embodiment of the vacuum attachment device utilizes vacuum pumps 12 with more than one pump motor attached to more than one output driver, the programmable controller 18 does not cause multiple pump motors to be started at the same time, but staggers their start times. This can reduce the peak load on the battery 28 which would otherwise be caused by the current surge caused by starting each motor occurring simultaneously.

A software algorithm executing in the programmable controller 18 can evaluate the vacuum levels and rate of vacuum decrease in each vacuum circuit in order to estimate when the vacuum level in each circuit will drop to the threshold vacuum level which typically causes the corresponding pump to run and restore a high vacuum level. If vacuum circuits which are serviced by independently controllable pumps are anticipated to reach said threshold level at nearly the same time, the one expected to reach it first can be started preemptively so it can finish restoring a high vacuum level before the other one reaches the threshold level and needs to be started. In this way, the requirement to prevent either circuit from dropping below the threshold level can be satisfied without it becoming necessary to run both pumps simultaneously. Avoiding needing to run the pumps simultaneously can reduce the peak load on the battery, providing the benefit of enabling the attachment to be maintained longer as the battery is drained due to use.

In an alternate embodiment, a measurement of the vacuum level may be used in place of a calculation of time as an indication of how long it will be before the threshold vacuum level is reached.

When a first vacuum pump is turned off, the time before each other vacuum pump will need to run (to maintain the threshold vacuum level as described above) is compared to a time threshold. If it is anticipated that another pump will need to run in less than the threshold time, it can be started immediately. This can give the impression to the operator that the pumps ran only once, rather than twice in short succession, which in turn can prevent the false impression that there is a significant system leak that has caused it to run in quick succession.

In an alternate embodiment, a measurement of the vacuum level may be used in place of a calculation of time.

When only a single vacuum pump motor is used (regardless of the number of pump heads), the two outputs from the interface PCB 76 which can supply power for pumps may be connected in parallel. This can provide redundancy in case one such output fails, and otherwise reduces the amount of heat generated by the output drivers.

There may be several variations on the interface PCB 76 with different combinations of inputs, outputs, and integrated sensors. Some such embodiments may have specialized functions for hoist control, counter-balancer operation, etc.

Some control functions may be activated automatically and some operator functions may be blocked based on the orientation of the control board 26 and/or interface PCB 76. Said orientation may be determined using a tilt sensor, accelerometer, gyroscope, IMU (intertial measurement unit) or by other means.

According to one embodiment, system 10 employs a calibration process that is used to determine "normal" operation. Information indicative of typical operation of system 10, such as operational parameters according to a mode of operation of system 10, can be stored in memory 24 for comparison. Additionally, by recording in memory the operations of the system 10, those operations surrounding unexpected conditions or events are recorded and will be retrievable and may be used as a means to help identify the cause of the unexpected condition or event.

In use, the system 10 can record the active state of the attachment device. Accordingly, in the case of unintended power loss, if power is regained system 10 can retrieve the most recent active state and return the system 10 to its prior mode of operation. The real-time clock 20 may be used in combination with the memory 24 to determine how long the power was off and adjust the response.

System 10, and in particular a software algorithm executed by programmable controller 18, can utilize a representation of time elapsed since one or more previous readings or events (power up, change in input, time/date, etc.). In particular, programmable controller 18 can evaluate characteristics of vacuum and battery information on rates of change. For example, it can use vacuum sensor readings taken over time from vacuum level sensor 36 to evaluate the increase in vacuum when the vacuum source is active and similarly uses vacuum sensor readings over time from vacuum level sensor 36 to evaluate the rate of vacuum loss when vacuum source is not active. It can also measure voltage of the battery over time to evaluate the rate of voltage drop of the battery to determine health and charge of the battery.

Figure 4:
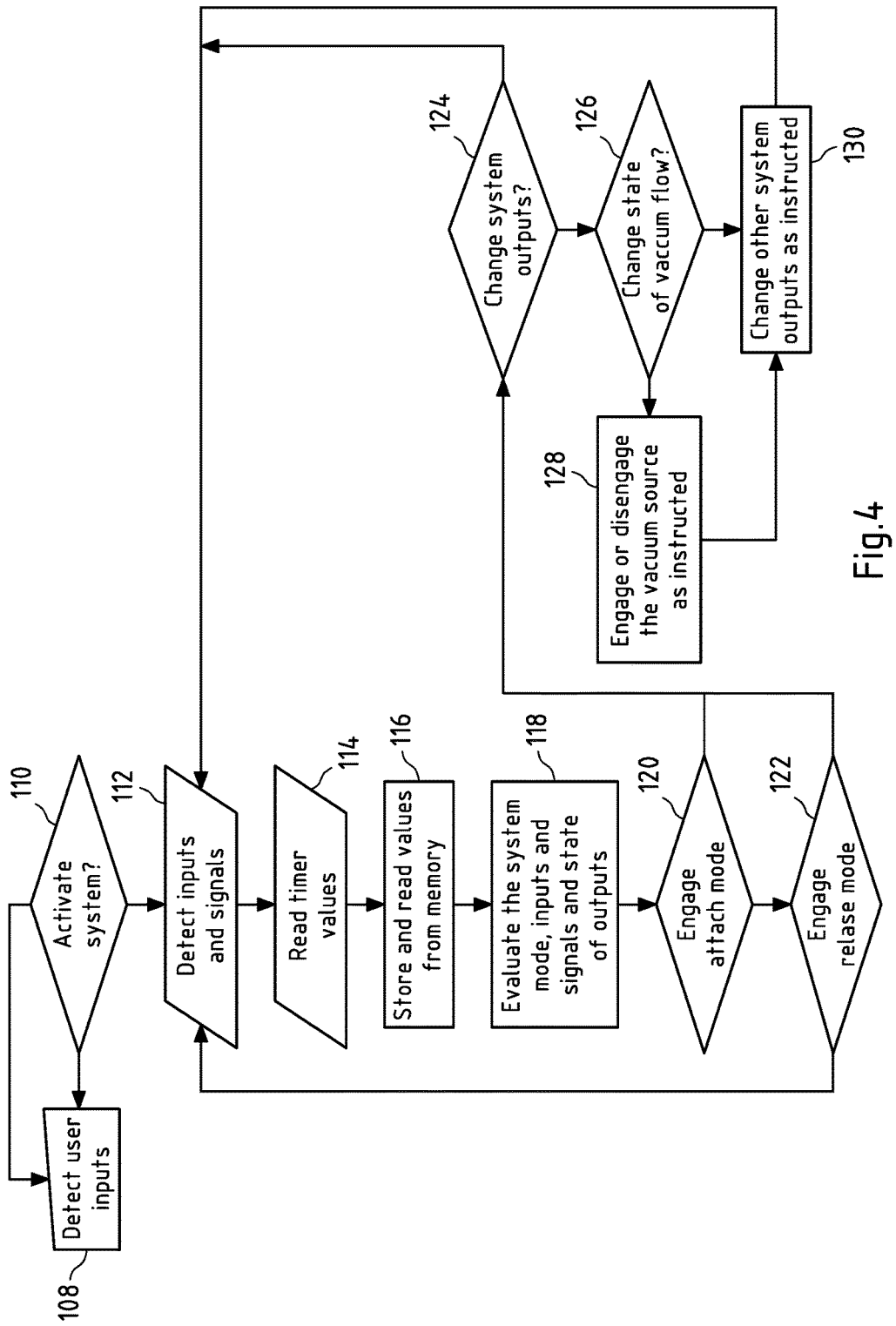
FIG. 4 is a schematic flow chart illustrating a method for controlling a vacuum system in accordance with one embodiment of the present invention.

With reference now to FIG. 4, a high-level flowchart illustrating a general method of operation and operational control and flow-sequence of system 10 is illustrated and described according to one embodiment of the present invention.

Beginning at step 108, programmable controller 18 can detect user inputs from a user who has entered one or more inputs into system 10 using operator inputs 30.

At step 110, programmable controller 18 can determine, following in some embodiments a required operator log-in and based on the detected inputs that the programmable controller 18 has received, whether to activate system 10 and thereby prepare it for and enable normal operation. If a determination is made not to activate system 10, system 10 can continue to await detection of additional operator inputs. When, at step 110, programmable controller determines, based on one or more detected operator inputs to activate system 10, processing advances to step 112.

At step 112, programmable controller 18 can detect signals from other components of system 10, such as the various sensors and inputs from wired or wireless operator inputs for controlling system 10. An aspect of the present invention includes a programmed sequence of button inputs that is indicative of a desired command, such as a time-limited latching release command. Accordingly, it is at step 112 at which such an input sequence of inputs of buttons can be detected. With respect to sensing values of sensors and outputs, the microprocessor in programmable controller 18 can take readings of sensor and inputs multiple times per second so that system 10 is effectively continuously monitored by programmable controller 18, although technically monitoring occurs repeatedly in rapid succession.

At step 114, in particular, programmable controller can read a current value of the timer 20 and/or timers implemented using other hardware such as that internal to the processor.

As illustrated at step 116, system 10 can store the values it receives from the various components of system 10 and can read from memory 24 those values as well as additional values that have been previously stored that are indicative of past sensed values of components of system 10 and/or data indicative of the change of such values over time previously stored.

As illustrated at step 118, based on the detected values as well as values read from memory 24, system 10 and in particular programmable controller 18 can evaluate the current mode of system 10, evaluate the current inputs and signals relative to past data, and evaluate the state of the outputs of system 10. In particular, at step 118, programmable controller 18 can compare responses from components with information stored in memory 24 which is indicative of the expected operation or operating ranges of components and/or system 10.

Additionally, at step 118 the programmable controller can evaluate the environmental conditions (temperature, humidity, atmospheric pressure, etc.) and adjust system parameters, thresholds, and/or ratings. It can also improve the accuracy of the information presented to the operator.

Additionally, at step 118, programmable controller 18 can determine whether changes should be made to thresholds and outputs based on performance of system 10. For example, if it is determined that higher vacuum levels can be achieved (based on measured performance or atmospheric pressure), system 10 can enter high-vacuum mode and increase the minimum vacuum level for increased safety. Further, if elevation (or other system performance) makes typical minimums unattainable, then the system can allow the operator to authorize use with a reduced capacity and will notify the operator of the reduced capacity.

Additionally, at step 118, programmable controller 18 can make determinations, based on evaluation of the system mode, inputs and signals, and the state of outputs, whether to disable or limit functions (when safety may otherwise be compromised) or whether to restrict operator control entirely. According to one embodiment, the control system 59 of the invention can be designed to manage powered motion through powered motion actuators 71 and, when programmable controller 18 determines that a non-essential function may be compromising the ability of the primary safety features necessary to run system 10, programmable controller 18 can disable or limit the use of those non-essential (i.e., auxiliary) functions. For example, if programmable controller 18 determines that the battery 28 is too low or the load too great, programmable controller 18 can enter system 10 into a limp mode in which the powered motion is enabled only intermittently in order to ensure priority to the components required to maintain safety (i.e., vacuum pumps and warning indicators).

Additionally, as stated, at times it may be important to restrict operator control of some functions entirely and to thereby "lock-out" operator control. For example, if the attachment device is not already attached to an object and programmable controller 18 determines that power supply conditions do not meet necessary criteria, the operator can be prevented from initiating a new attachment. According to another embodiment, if the attachment device is already attached to a load, programmable controller 18 can prevent the operator controls to be used to shut-off system 10 by normal means (because the load may also be suspended) and a user-override is then necessary to continue with shutdown.

With continued reference to FIG. 4, as illustrated at step 120, programmable controller 18 of system 10 can determine based on the evaluation processed at step 118 whether system 10 should engage an attach mode for the purpose of attaching the attachment device associated with system 10 to an object. When programmable controller 18 determines at step 120 to not engage attach mode, processing advances to step 122.

As illustrated at step 122, based on the evaluation processed at step 118, system 10 can determine whether system 10 should engage in a release mode for the purpose of releasing an object that may be attached to the attachment device associated with system 10. When it is determined at step 122 to not engage in release mode, processing can return to step 112 at which system 10 continues to collect information pertaining to the current conditions of system 10 and, in particular, the variously described components of system 10.

When programmable controller 18 determines at step 120 to engage attach mode, and similarly when programmable controller 18 determines at step 122 to engage release mode, processing advances to step 124.

At step 124, programmable controller 18 can determine whether system outputs require change based on the evaluation at step 118 and the instruction received as a result of the determination made at either step 120 or step 122. This determination can be made by comparing the current system state with the state approved by the algorithm that evaluated the signals from operator controls, the vacuum system, and battery as well as other parameters. When, at step 124, programmable controller 18 can determine that system outputs do not require change, processing returns to step 112 at which system 10 continues to collect information pertaining to the current conditions of system 10 and, in particular, the variously described components of system 10. When, at step 124, it is determined based on the evaluation at step 118 and the instruction received as a result of the determination made at either step 120 or step 122 that system outputs require change, processing advances to step 126.

With continued reference to FIG. 4, at step 126, programmable controller 18 can determines whether the changes required to system outputs require a change of the state of vacuum flow in system 10 and, in particular, in a vacuum circuit 41 pertaining to the sensed and evaluated information. The operator input can be used in combination with other inputs, calculated values, and values retrieved from the memory to determine a system objective such as maintaining the attachment, releasing the attachment, or minimizing power usage while waiting for further input. Each output can then be controlled so as to achieve said objective. For example, if the objective is to maintain the attachment and the vacuum level is low, the vacuum source 12 is turned on and the control valve 50 is turned off. When it is determined at step 126 that a state of vacuum flow requires change, processing advances to step 128.

As illustrated at step 128, programmable controller 18 instructs the vacuum source 12 to be engaged to effect the necessary change of vacuum in system 10 and, in particular, in vacuum circuit 41.

As illustrated at step 130, when it is determined at step 124 that outputs require change, whether or not vacuum flow is adjusted, system outputs other than the flow of vacuum are adjusted (or not) as instructed and processing then returns to step 112 at which system 10 continues to collect information pertaining to the current conditions of system 10 and, in particular, the variously described components of system 10.

Figure 5:
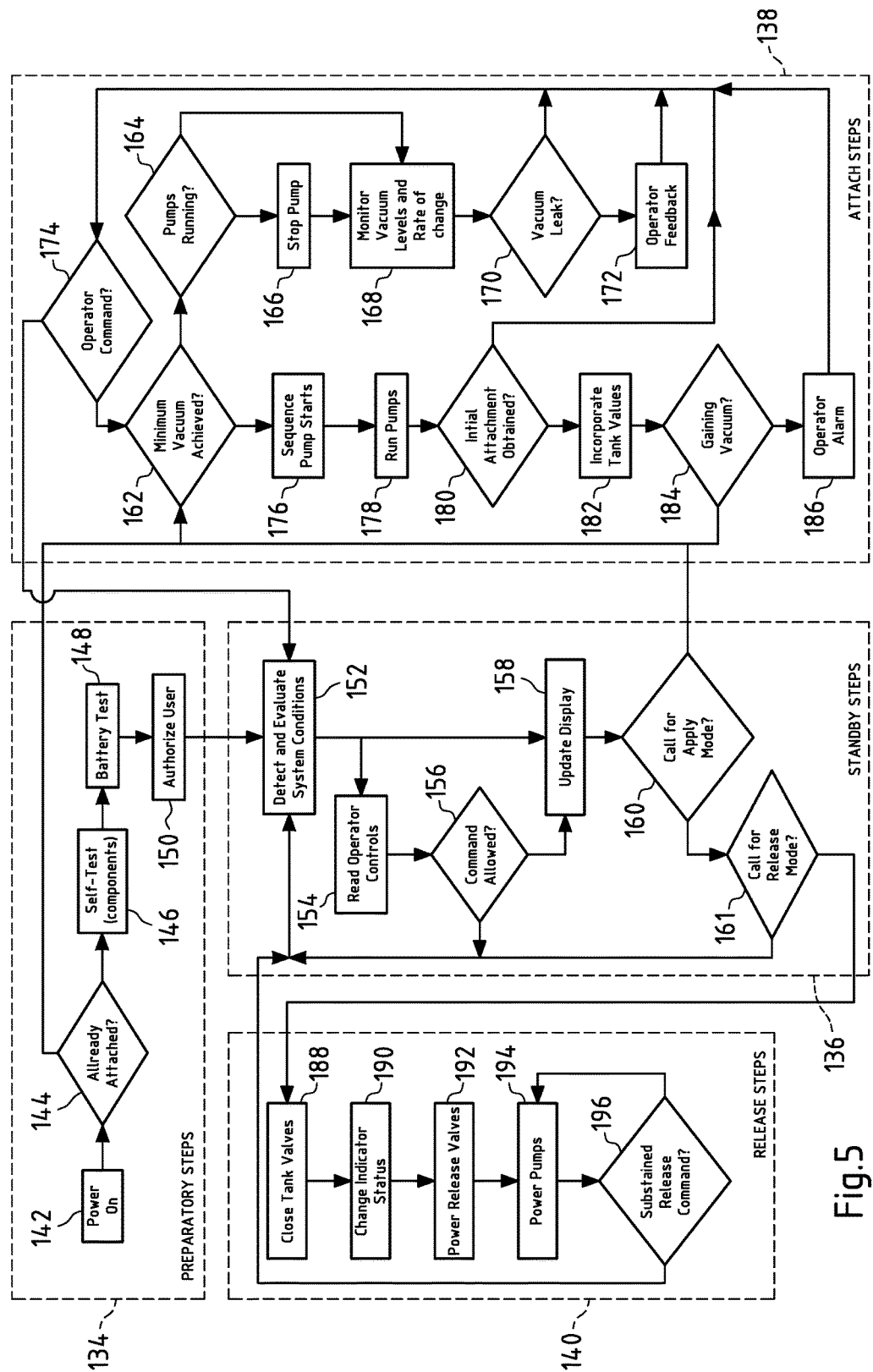
FIG. 5 is a schematic flow chart illustrating a method for controlling a vacuum system in accordance with one embodiment of the present invention.

With reference now to FIG. 5, a flowchart illustrating a method of operation of system 10 according to one embodiment of the present invention is illustrated and described in greater detail.

As illustrated in FIG. 5, operation of system 10 may be categorized by different modes of operation, each having associated steps of operation that are implemented by programmable controller 18 processing instructions in software programs. In particular, FIG. 5 illustrates four modes of operation, including preparatory mode 134, standby mode 136, attach mode 138, and release mode 140.

As shown in FIG. 5, beginning with the preparatory steps of preparatory mode 134, system 10 can be powered-on at step 142.

At step 144, programmable controller 18 can determine, using sensed vacuum levels and possibly rate of change of vacuum levels in comparison with historical operational information of system 10 and/or stored operational characteristics known to be indicative of an attachment, whether the attachment device with which system 10 is associated is already attached to a surface. When programmable controller 18 determines at step 144 that the attachment device is not already attached to a surface, processing advances to step 146 at which system 10 can perform a self-test. According to one embodiment, at step 146, programmable controller 18 can test the components of system 10. Power can be cycled to individual components both individually and in systematic combinations. The combination of current, voltage, vacuum level, temperature, and other sensors and feedback signals can be evaluated both at a single moment in time and their response over time to verify they are within an acceptable range. The values can also be compared to calibration values and historical records to identify trends in the system function. Processing can then advance to step 148 at which a test of battery 28 can be performed. As described herein, if battery 28 has insufficient power, the operator may be locked out of certain functions and features of system 10 (such as ability to enable an attach mode).

At step 150 of preparatory mode 134, programmable controller 18 can authorize the user who is operating system 10. According to one embodiment, the operator can have pre-registered credentials with system 10 and been given log-in credentials, such as one or more of a user-name, password, Personal Identification Number (PIN), etc. In one embodiment of the invention, a biometric input device, such as a fingerprint scanner, can be employed and biometric information indicative of an operator is stored in memory 24 (or another memory), such that the operator must be authorized by proper biometric credentials. According to one embodiment, these log-in credentials must be entered into the programmable controller of system 10 and system 10 must recognize the user as being authorized to use system 10 and the particular equipment with which system 10 is associated before system 10 will permit access to further operational features. Additionally, information indicative of the operator's log-in (such as date and time of day and log-in credentials) can be stored in memory 24.

According to one embodiment, it is a particular aspect of the invention to store, in conjunction with log-in credentials of a user, indications that the user has achieved certain operational training and/or certificates that are desired and/or necessary for operation of the particular equipment associated with system 10. According to this embodiment, system 10 can be constructed to prevent users who have not had adequate or required training from operating system 10. If the system detects that a load is already partially attached, the load is secured as previously described, but an operator login is still required to manually activate subsequent release and attach functions. Following step 150 and/or the authorization of the operator, processing advances to standby mode 136, as illustrated.

At step 152 of standby mode 136, system 10 and in particular programmable controller 18 can detect and evaluate the conditions of system 10. This can be accomplished by reading sensors, timers, operator inputs, and/or feedback signals, evaluating them with the system algorithms, comparing them as appropriate to historical records and determining any need for a change in function or outputs.

With continued reference to FIG. 5, at step 154, programmable controller can read the operator inputs 30. Upon receipt of an operator input, processing advances to step 156 at which programmable controller 18 can determine whether the input received at step 154 is an allowed command based on the system conditions determined at step 152. When it is determined that the operator input received at step 154 is an allowable command, the display can be updated at step 158 (the display can also be updated as the result of the detection and evaluation of system conditions at step 152), and processing advances to step 160.

At step 160, programmable controller 18 can determine whether the received operator input is instructing the system to enter attach mode 138. When it is determined at step 160 that a call to enter attach mode has been received based on the input entered by the operator, processing can advance to attach mode 138. When, however, it is determined at step 160 that a call for attach mode has not been received, processing can advance to step 161. At step 161, programmable controller 18 can determine whether the operator instruction received corresponds with an instruction to enter release mode. When it is determined at step 161 that the input instruction is to enter release mode, processing advances to release mode 140. However, when it is determined at step 161 that the operator instruction that has been input does not correspond with a call to enter release mode, processing can return to step 152 where other accepted operator commands are processed and the system can continue to detect and evaluate system conditions and await additional operator input (or other triggering event).

When it is determined at step 160 that the operator has input a request to enter attach mode 138 and, similarly, when programmable controller determines at step 144 of preparatory mode 134 that the attachment device associated with system 10 is already attached to a surface of an object, processing can advance to step 162 of attach mode 138.

At step 162 in attach mode 138, programmable controller 18 can determine whether a minimum required vacuum level is achieved. When it is determined at step 162 that a minimum vacuum level is achieved for attaching the device to the surface of an object, processing advances to step 164 at which programmable controller 18 can determine whether vacuum pump(s) 12 are pumping. When it is determined at step 164 that vacuum pump(s) 12 are pumping, programmable controller 166 can instruct the pump(s) 12 to stop pumping. Following the stoppage of the pumps at step 166, or when it is determined at step 164 that the pump(s) 12 are not pumping, processing advances to step 168 at which programmable controller 18 can monitor the vacuum levels in system 10 and the rate of change of the vacuum levels in system 10 using readings from vacuum level sensor(s) 36, timer 20, and historical and calculated system information stored in memory 24.

At step 170, programmable controller 18 can make a determination whether a vacuum leak has been detected in system 10. In particular, programmable controller can use the rate of change of vacuum level determined at step 168 and compares said rate of change with one or more characteristics to determine whether the current operating conditions are indicative of a vacuum leak. When it is determined at step 170 that a vacuum leak has been detected, feedback can be provided to the operator at step 172. This feedback may be in the form of a visual indicator on a control panel and/or graphical information on the display 22. According to one embodiment of the invention, information indicative of the severity of the leak as well as information indicative of a time, based on the rate of the leak, to lower-limit vacuum threshold (i.e., corresponding to an emergency or potential failure mode) is provided. This can be accomplished with text or graphically on the display 22 and/or with the rate at which an output provides a sequence of outputs (buzzes, flashes of a bulb, etc.). Following the operator feedback step 172, or in the alternative when it has been determined at step 170 that a leak has not been detected, processing can advance to step 174.

Returning to the discussion of step 162, when programmable controller 18 determines at step 162 that a minimum attachment vacuum level has not been achieved for adequately attaching the object to the attachment device, processing advances to step 176 at which programmable controller 18 can construct a pump start sequence based on the number of pumps in the system and, as step 178, the pump(s) 12 can be started.

At step 180, programmable controller 18 can determine whether an initial attachment of the attachment device is obtained. When it is determined at step 180 that an initial attachment of the attachment device has been obtained, processing advances to step 182 at which the tank valve(s) 56 can be incorporated and then to step 184 at which programmable controller 18 can determine whether the vacuum circuit 41 is gaining vacuum.

When programmable controller 18 determines at step 184 that system 10 is not gaining vacuum (or is not gaining vacuum at a sufficient rate), an operator alarm can be output at step 186. Following initiation of such an operator alarm at step 186, or when it is determined at step 180 that an initial attachment has not been obtained, processing can advance to step 174. When programmable controller 18 determines at step 184 that system 10 is gaining vacuum (or is gaining vacuum at an acceptable rate), processing can return to step 174.

At step 174, programmable controller 18 can detect whether a release operator command is received. When it is determined at step 174 that a release operator command has not been received, processing can return to step 162 and the system can continue processing according to the flowchart diagram of FIG. 5. When, however, it is determined at step 174 that a release operator command has been received (i.e., a release command from the operator has been initiated or, according to a feature of the invention, an extended "OFF" command is initiated (which activates warnings)), processing can advance back to the processing steps of standby mode 136 (previously described) and, in particular, to step 152, and the system 10 can continue processing according to the flowchart diagram of FIG. 5.

Returning to the discussion of step 161, when it is determined in the processing of step 171 that the operator has entered an input to enter release mode, processing can advance to release mode 140. According to one embodiment, when it is determined at step 161 that the operator has entered an input to enter release mode, processing can advance to step 188 of release mode 140 at which programmable controller 18 can execute an instruction to close tank valve(s) 56.

Processing advances to step 190 at which a status indicator on the control panel can be changed to indicate that the system 10 is in release mode such as engaging the strobe light 104.

At steps 192 and 194, release valve(s) and pump(s) 12 can be powered so as to reduce vacuum in system 10 for the purpose of releasing the object attached to the attachment device.

At step 196, programmable controller 18 can determine whether it has received a time-limited latching release command. When programmable controller 18 determines at step 196 that it has received a latched release command, processing can return to step 194 to continue processing the release steps of release mode 140. When, however, programmable controller 18 determines at step 196 that it has not received a latched release command, processing can advance back to the steps of standby mode 136 and, in particular, to step 152.

According to one embodiment, as discussed below in conjunction with FIG. 6, by pressing various combinations of push-buttons 30 the operator can power on the attachment device, activate the attaching mode and activate the releasing mode. These buttons can also be used for additional functions.

Figure 6:
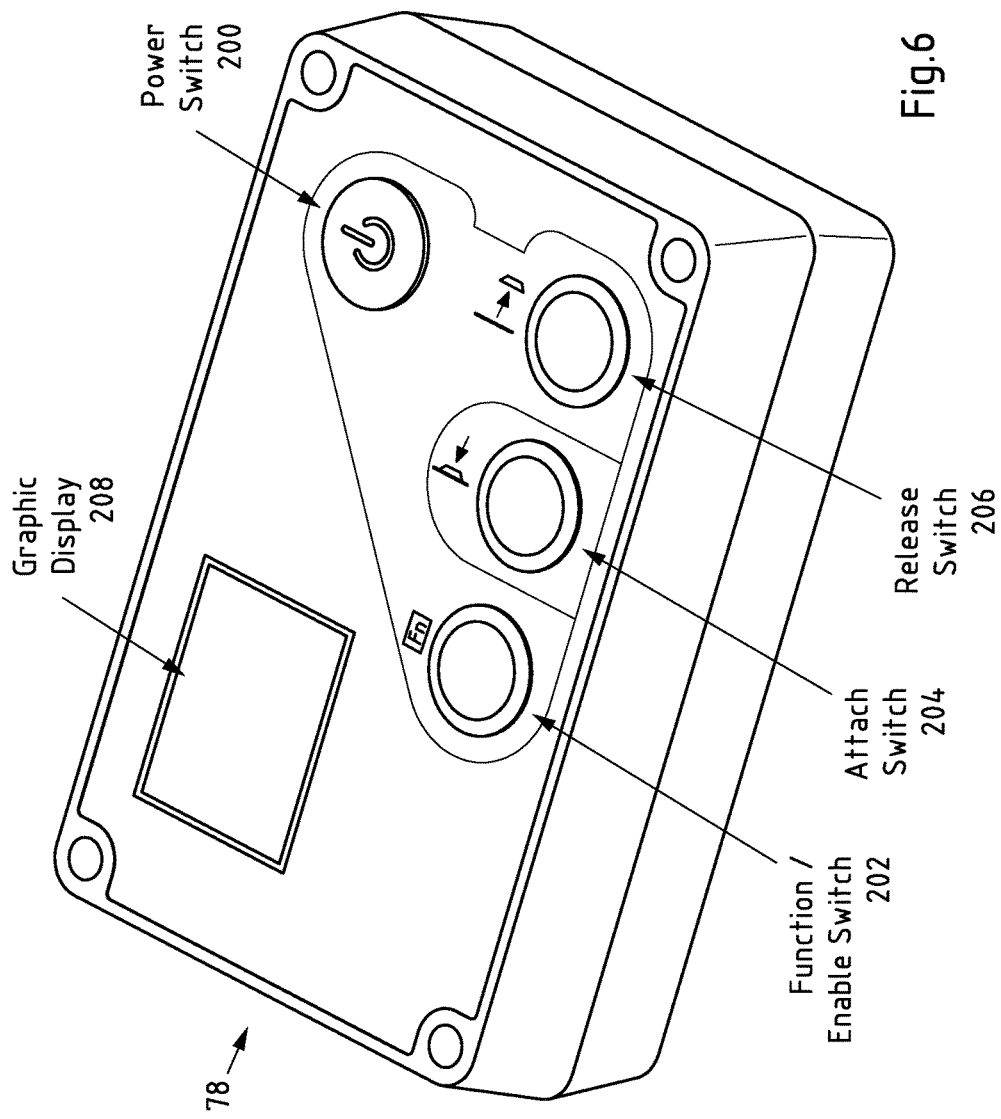
FIG. 6 is a perspective view of a control panel of a programmable controller used in a vacuum control system in accordance with one embodiment of the present invention.

In particular, as depicted in FIG. 6, one embodiment of the control system interface can include four switches, generally referenced herein as inputs 30 and here more specifically referenced here according to their primary functions of power switch 200, function/enable switch 202, attach switch 204, and release switch 206, a graphic display 208 (also illustrated schematically as reference numeral 22 in FIG. 3), and remotely mounted (not shown) audio alarm 102, green lift light 106, strobe light 104, and vacuum gauge(s) 58. The control system interface can be accessible at a top or front face of the enclosure 78. Keeping the interface and operator requirements simple can make it easy to understand and operate.

Multiple control buttons can be used both individually and in combinations or sequence to enhance safety and provide for more advanced functions. The graphic display 208 can prompt the operator when the need for button combinations is anticipated. For example, according to one embodiment, to engage the release mode, the function button 202 and release button 206 must both be pressed and held. If only the release button 206 is pressed, the graphic display 208 can suggest that to activate the release operation, the function button 202 must also be pressed. Similarly, according to one embodiment, to power the equipment off, the function button 202 and the power button 200 much be pressed at the same time and the graphic display 208 is used to prompt the user to press the function button 202 if only the power button 200 is pressed.

The vacuum gauge(s) 58 can continuously display the vacuum reading in each vacuum circuit 41 with or without power. The green light 106 can illuminate when the minimum vacuum level for a determined secure attachment is obtained. According to one embodiment, if a reduced vacuum level is authorized it blinks corresponding to the reduction in capacity due to the reduced vacuum. For example, according to one embodiment, for each 10% reduction in capacity it can add a blink to the sequence. The strobe light 104 can flash when the vacuum system cannot maintain the minimum required vacuum or when operator controls are being pressed that may be used to engage the release mode. The audio alarm 102 can be used for several modes of notification with occasional chirps being used for notifications like low voltage in the power loss warning battery and continuous tones for conditions with significant hazards like in a power loss condition or when the vacuum systems cannot maintain vacuum above the required minimum level.

With reference to FIG. 6, the graphic display 208 can provide information for use and maintenance at the times when it is relevant and can be done in a way to maximize clarity.

Under typical operation, when the equipment is powered up, the display can initially show the hardware and software revisions as this information may be needed for support. This information can also available from a maintenance and system test screen.

According to one embodiment, the graphic display 208 can indicate when the automatic self-test is in process and any malfunction will be displayed to notify the operator. Following the self-test, the operator can be prompted for a login when this feature is enabled. Once logged in, and the equipment is in an operational mode, the graphic display 208 can include images and text for critical parameters that the operator should occasionally monitor like the battery health and energy level. The graphic display 208 can also indicate which mode the system 10 is in, such as for example: attach, release, standby, self-test, maintenance, etc. If a switch is activated, that switch can be identified on the graphic display 208 and any potential combination of switches identified via a prompt.

According to one embodiment, if the system 10 identifies an abnormal behavior or malfunction, the condition and need for service can be displayed. Similarly specific system tests and their results can be reported. Historical data can be recalled and displayed in text, table, or graphic form.

Figure 7A:
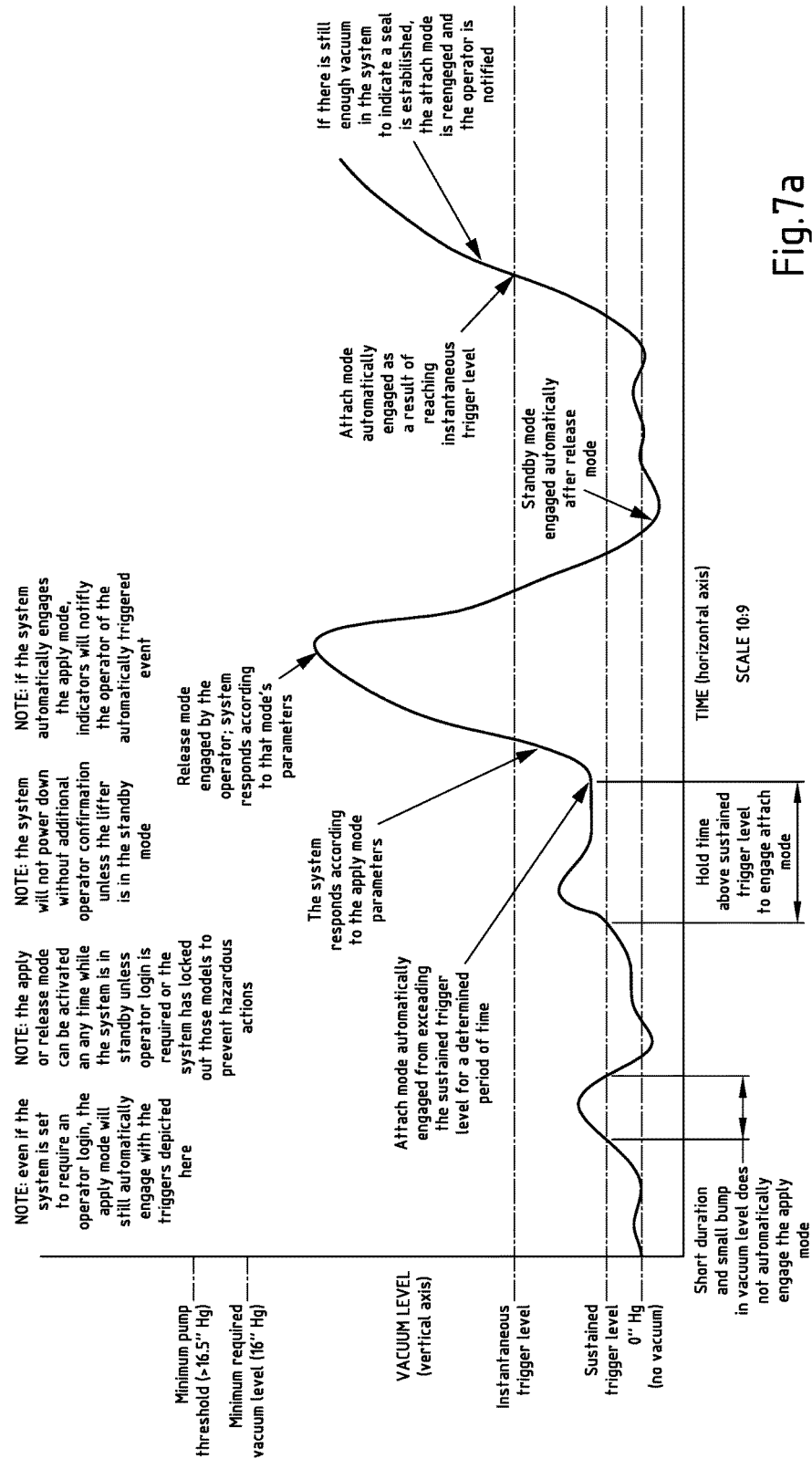
Figure 7B:
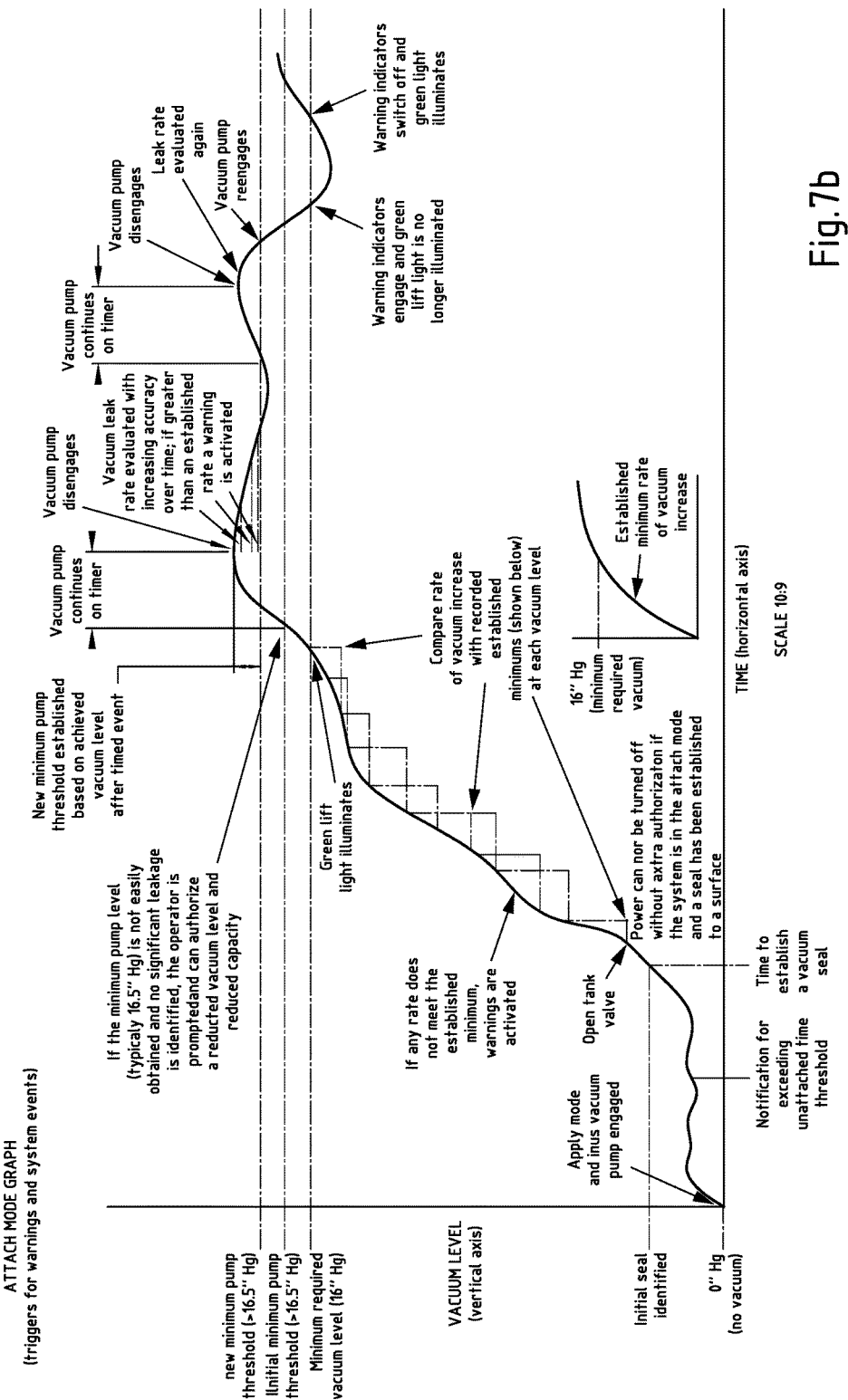

With reference to FIGS. 7A-7C, timing diagrams illustrating information indicative of sensor output over time and triggering events corresponding to different modes of operation of the control system of the present invention are illustrated and described. In particular, FIG. 7A is indicative of standby mode, FIG. 7B is indicative of attach mode, and FIG. 7C is indicative of release mode.

As described, high resolution vacuum sensors 36 are capable of very accurately measuring a significant number of, and very small changes in, vacuum levels. Such measurements taken over time can result in information as indicated in FIGS. 7A-7C. In certain embodiments of the invention, measurements from vacuum sensor(s) 36 are reported to programmable controller 18 at least every 10 seconds. In one embodiment, vacuum measurements are reported to programmable controller 18 at least every 5 seconds. In still other embodiments, vacuum measurements from sensor(s) 36 can be reported to programmable controller 18 (i) at less than 5 second intervals; (ii) at less than 2 second intervals; (iii) at less than 1 second intervals; (iv) at less than $\frac{1}{5}^{th}$ second intervals; (v) at (or approximately at or at least substantially at) $\frac{1}{10}^{th}$ second intervals; and (vi) at less than $\frac{1}{10}^{th}$ second intervals. It will be appreciated that other time intervals may be employed.

Accordingly, the present invention, as illustrated and described, provides a vacuum and vacuum control system for a vacuum attachment device such as, but not limited to, a below-the-hook lifter for lifting and moving smooth non-porous pieces of material, such as construction materials glass, metal, stone, fiberglass, etc. Additionally, the present invention provides a vacuum attachment device having a vacuum and vacuum control system as illustrated and described.

As described, the system 10 of the present invention, and a vacuum lifter of the present invention employing system 10, has a variety of useful and/or advantageous and operational features, including but not limited to (i) the vacuum attachment device has an electrical or electronic control component implementing one or more software programs or algorithms to substantially continuously monitor operations of system components of system 10; (ii) the control component is integrated with or communicates with one or more operator input devices (such as buttons, switches, proximity sensors, RF ID readers, voice recognition devices and receptors for remotely generated signals); (iii) the control component incorporates or receives input from one or more sensors such as may be used to measure vacuum levels, battery voltage, or current draw wherein at least one such sensor (e.g., sensing circuit) is capable of representing the measured value with a resolution of ten or more levels; and (iv) the control component has a means for controlling a vacuum source and optionally other pneumatic components (such as valves), status indicators, warning indicators, alarms, graphical displays, wireless communication devices, or other system components.

As described herein, the control system 59 can include embodiments with one or more of the following features:
(i) More than one circuit board that is inter-connected with a means of communication. In one embodiment, one or more control board 26 and one or more interface PCB 76 can communicate with each other. In one embodiment, system 10 may have up to six circuit boards, depending on the complexity of the system, at least some of which communicate with each other;
(ii) Wireless communication with one or more portable electronic devices for providing information of system conditions, environment, proximity to other objects, position, mass of supported load, and warnings. In particular, embodiments of the invention include activating an audible, visible, and/or vibratory alarm/indication on a mobile device. Additionally, the programmable controller 18 may send a signal that is broadcast to multiple mobile communications devices. Additionally, mobile devices may be used to send and receive troubleshooting information related to system 10, such as by e-mail, uploading a file, etc.;
(iii) A wired or wireless remote control such as a pendant or radio control which may or may not be movable to accommodate various operator positions;
(iv) Sensing and evaluating components operating out of their specifications and disabling or overriding them to prevent conditions that might further compromise the system. In one embodiment, sensors utilized by system 10 can detect overload conditions and the software can sequence certain things to identify the location of the fault. If reasonable to safely do so, the fault location can be de-energized to prevent additional failures. For example, if the current reading is too high, the software can turn a device off, effectively operating like an intelligent resettable circuit breaker. If sensor readings are outside their acceptable ranges, they are rejected and that portion of the system enters a "safe mode"; and
(v) An optical display for displaying images including graphical images indicative of performance of system 10 and components of system 10.

Additionally, the vacuum attachment device incorporating system 10 can utilize advantageous method steps, including any combination of the following:
(i) A preparatory sequence including the steps of:
(a) Determining the state of one or more user inputs, and
(b) Acting on the user input to prepare for or begin the process of attaching with the preferred embodiment of turning on an illuminated power indicator, enabling an alarm monitor, and performing a self-test;
(ii) An operation sequence including the steps of:
(c) Detecting sensor outputs wherein at least one sensing circuit distinguishes between measured values with a resolution of ten or more levels as may be used to sense vacuum levels, battery voltage, current draw, time;
(d) Utilizing at least one algorithm to determine if one or more of the components of the device should be activated/deactivated;
(e) Controlling outputs such as engaging or disengaging the vacuum source components and optionally, one or more warning indicators, status indicators, graphical display images, wireless communication, or other system components; and
(f) Repeating one or more of the prior steps 'c' through 'e'. As described above, programmable controller 18 can sense values of the sensors multiple times per second so that system 10 is effectively continuously monitored by programmable controller 18.

The method of the present invention can further include:
(i) Storing records of inputs and/or state variables;
(ii) Using stored inputs or state variables in one or more evaluation algorithms. This information, stored in memory 24, can provide a basis for comparison during future operation of system 10;
(iii) Utilizing a representation of time elapsed since one or more previous readings or events (power up, change in input, time/date, etc.);
(iv) Disconnecting the vacuum supply once certain criteria are met and reengaging based on alternate criteria with the preferred embodiment including evaluations of both vacuum levels and rates, as well as time. In this regard, the control system 59 of the present invention cycles power for the vacuum pump(s) 12 when there is a call for vacuum. The programmable controller 18 can power both the vacuum pump 12 power and control valves 50 when a vacuum release command is executed.
(v) Limiting the allowable operator functions based on algorithm results with the preferred embodiment of preventing the operator from initiating a new attachment if power supply conditions do not meet necessary criteria (or preventing the device to be shut-off by normal means while attached to a load);
(vi) Activating the operator controls through means of a login process established with the potential of ensuring training before use and logging operators and their usage;
(vii) Connecting to and disconnecting vacuum reservoirs from the vacuum circuit;
(viii) Releasing the vacuum incorporates a timing event for controlling operation without maintained operator input. In this regard, according to one embodiment of the invention, operator inputs are normally momentary; buttons need to be held to make the action continue. In accordance with one embodiment of the invention, a particular push-button sequence causes the release function to latch on for a period of time;
(ix) Measuring when non-essential functions may be compromising the ability of the primary safety features to run and disabling or limiting their use;
(x) Adjusting system parameters, thresholds, or ratings based on environmental factors like accounting for the effects of temperature, humidity, atmospheric pressure;
(xi) Disabling the device (releasing the attachment) in response to operator inputs is restricted or delayed if system conditions or state indicate that a load may still be attached;
(xii) Adjusting the minimum threshold parameters optionally allowing a positive change for increased design factor or performance and a negative change resulting in reduced performance but the ability to proceed with authorization.

As will be apparent in view of the foregoing description, the present inventions are systems and methods that in embodiments may employ computer software, algorithms, and computing equipment. Some portions of the foregoing detailed description may be presented in terms of algorithms and symbolic representations of operations on data bits within a computer memory. These algorithmic descriptions and representations are ways used by those skilled in the data processing arts to effectively convey the substance of their work to others skilled in the art. An algorithm is here, and generally, considered to be a self-consistent sequence of steps leading to a desired result. The steps used in an algorithm are those requiring physical manipulation of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the description herein, terms such as "processing" or "computing" or "calculating" or "determining" or "displaying" or the like refer to the action and processes of a computer system, or similar computing device, that manipulates and transforms data represented as physical (e.g., electronic) quantities within the computer system's registers and memories into other data similarly represented as physical quantities within the computer system's registers or memories or other such information storage, transmission or display devices.

As will also be appreciated, certain aspects of the present invention can be implemented in hardware, software, firmware, or a combination thereof. In one exemplary embodiment, aspects of the invention are implemented with a computer program or programs that are readable by a microprocessor in programmable controller 18.

In this description, any references to "one embodiment", "an embodiment", or "embodiments" mean that the feature or features being referred to are included in at least one embodiment of the technology, hardware, software, firmware, and/or components of the invention. Separate references to "one embodiment", "an embodiment", or "embodiments" in this description do not necessarily refer to the same embodiment and are also not mutually exclusive unless so stated and/or except as will be readily apparent from the description to those skilled in the art. For example, a feature, structure, act, etc. described in one embodiment may also be included in other embodiments, but is not necessarily included. Thus, the present technology, systems, and methods can include a variety of combinations and/or integrations of the embodiments described therein.

Algorithms of the present invention as described herein may be implemented in computer programs stored in or on computer-readable medium residing on or accessible by the microprocessor in the programmable controller 18 and/or wireless communications equipment 62. The computer programs preferably comprise ordered listings of executable instructions for implementing logical functions in programmable microcontroller 18. The computer programs can be embodied in any computer or microprocessor-readable medium for use by or in connection with an instruction execution system, apparatus, or device, such that the instructions can be fetched from or identified in the instruction execution system and executed. The computer-readable medium can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, or device. More specific, although not necessarily inclusive, examples of the computer-readable medium would include the following: an electronical connection having one or more wired connections, a portable computer diskette, a random access memory (RAM), a read-only memory (ROM), an erasable, programmable, read-only memory (EPROM or Flash memory), an optical fiber, and a portable compact disk read-only memory (CD-ROM).

As explained above, aspects of the invention may be implemented with a computer program or programs, also referred to herein as "software", that operate computer equipment. Software generally refers to a set of statements or instructions to be used directly or indirectly in one or more computers in order to bring about a certain result. For the benefit of convenience, references made herein to software or programs "performing" certain functions shall be with the understanding that the function is performed by execution of the software using hardware, such as a microprocessor. It should also be understood that one or more of the following may apply to the present invention, namely, that (i) the system software of the present invention for performing certain functions may utilize and employ an operating system, drivers, web services, and/or communications instructions sets, (ii) the executable software is stored in memory or in an additional memory in machine codes that correspond to a native machine language instruction set comprised of a plurality of native instructions used by an electronic processor, (iii) each native instruction comprises a code that is readable by a processing architecture of the electronic processor and that can be used to specify particular electronic components for select functions, identifying particular memory locations, and controlling processes in the electronic processor, and/or (iv) executable software may comprise a set of machine codes selected from the native machine language instruction set corresponding to the electronic processor.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from spirit and scope of the inventive subject matter. Therefore, it is manifestly intended that this inventive subject matter be limited only by the following claims and equivalents thereof.

What is claimed is:

1. A system comprising:
a vacuum attachment apparatus comprising a vacuum circuit, wherein said vacuum circuit includes a battery or fuel cell powered vacuum source, and a vacuum pad, wherein said vacuum attachment apparatus is usable to vacuum attach to a surface of an object;
an electronic controller operable to execute instructions;
a vacuum level sensing circuit for measuring a level of vacuum in said vacuum circuit, wherein said electronic controller receives from said vacuum level sensing circuit one or more measured vacuum level values comprising a representation of a plurality of vacuum levels which enables distinguishing between vacuum levels at a resolution of at least 10 levels; and
a memory, wherein said received measured vacuum level values of said plurality of vacuum levels are stored in said memory;
wherein said electronic controller generates at least one output signal based on a result of comparing information indicative of said received measured vacuum level values with other information.

2. The system of claim 1, wherein said apparatus limits a said level of vacuum in said vacuum circuit so as to prevent damaging the attachment surface.

3. The system of claim 1, wherein said electronic controller is configured to process one or more algorithms that evaluate a change in said received measured vacuum level values over time to determine a rate of vacuum level change that may be caused by a leak.

4. The system of claim 3 wherein, when said rate of said vacuum level change exceeds a threshold rate, a warning indication is output to alert an operator.

5. The system of claim 1, wherein said electronic controller is configured to determine whether a load is attached to said vacuum attachment apparatus, wherein said determination comprises a finding that at least one measured vacuum level values from said vacuum level sensing circuit indicates at least one of (i) a higher level of vacuum than would be expected when said vacuum attachment apparatus is unattached, (ii) a higher level of vacuum than would be expected when said vacuum attachment apparatus was unattached and maintained for a period of time, and (iii) a pattern of change of said level of vacuum that would not be expected when said vacuum attachment apparatus is unattached.

6. The system of claim 1, wherein said vacuum attachment apparatus incorporates an attach mode in which the system takes actions in order to obtain and sustain a sufficient level of vacuum to maintain an attachment to said surface wherein, as the system operates said vacuum attachment apparatus, said electronic controller stores in memory an indication of whether or not the system is in said attach mode and wherein, upon a power-up of the system, said stored indication is read to determine if the system was in said attach mode when power was last lost and, when said indication is indicative of being in said attach mode when power was last lost, said programmed controller operates said system to restore the system to the said attach mode.

7. The system of claim 1, wherein said vacuum attachment apparatus incorporates an attach mode in which the system takes actions in order to obtain and sustain a sufficient level of vacuum to maintain an attachment to said surface, wherein during operation of said vacuum attachment apparatus, said electronic controller is configured to make a determination whether said system is in said attach mode, and wherein said electronic controller is configured to change or delay the process used to shut down said system when it is determined that said system is in said attach mode.

8. The system of claim 1 further comprising functionality wherein said electronic controller upon detection of a particular operator input or sequence of operator inputs enters a mode wherein a function that is typically active only while the operator controls are continuously held by the operator are maintained for a period of time or until some other condition is satisfied, such as to facilitate completely releasing an attachment.

9. The system of claim 1 further comprising a timer, wherein said electronic controller starts said timer when said level of vacuum in said vacuum circuit meets specific criteria such as reaching a minimum threshold vacuum level, and wherein said electronic controller utilizes the time elapsed since said timer was started as at least one factor when evaluating when to deactivate said vacuum source.

10. The system of claim 1, wherein said system further comprises one or more additional sensors and sensing circuits for providing a plurality of measurements, wherein said electronic controller is configured to compare said plurality of measurements with an expected range of values for said plurality of measurements under past and current operational modes and conditions, wherein said past and current operational modes and conditions includes conditions created by a self-test performed on a startup of said system and conditions created by normal operation of said system, wherein when a measurement of said plurality of measurements falls outside of said expected range of values, said electronic controller is configured to perform at least one of (i) limit an operational function of said system, (ii) change how said system operates, and (iii) provide information or warnings to an operator of said system.

11. The system of claim 1, wherein said memory has stored therein login authorization credentials of said vacuum attachment apparatus, wherein said system further comprising an input device for enabling an operator to enter said login authorization credentials, wherein said electronic controller is configured to authorize said operator to use said system and thereby give access to use of said system upon authentication of said entered login authorization credentials.

12. The system of claim 1, wherein said electronic controller further comprises a real-time clock, wherein said electronic controller is configured to utilize said real-time clock to track a passage of time even when said vacuum attachment apparatus is powered down, and configured to utilize said real-time clock to perform at least one of (i) provide reminders of when maintenance is required for said system and (ii) timestamp operational records stored in said memory to enable said records to be recalled to examine conditions surrounding a failure or accident.

13. The system of claim 1 further comprising a vacuum reservoir and a controlling valve, wherein a state of said controlling valve determines whether or not air can flow between said vacuum reservoir and said vacuum circuit, and wherein an output from said electronic controller controls said valve so as to cause said valve to do at least one of (i) open to assist in maintaining an attachment and (ii) close in order to preserve the vacuum in said reservoir when the system is not attached to said object.

14. The system of claim 1, wherein said system further comprises:
a temperature sensor, wherein the system is configured to evaluate a detected temperature sensed by said temperature sensor, wherein a result of said detected temperature is used cause the system to do at least one of (i) limit an operational function of the system, (ii) change how the system operates, and (iii) provide information or warnings to an operator of the system.

15. The system of claim 1 further comprising an atmospheric pressure sensor, wherein said electronic controller is configured to utilize one or more readings from said pressure sensor to do at least one of (i) adjust vacuum level thresholds, (ii) notify an operator of one or more effects of a reduction in a maximum achievable level of vacuum when operating under specified conditions, and (iii) identify a change in vacuum pump performance by evaluating achieved vacuum levels or rates of vacuum level increase based on a present atmospheric pressure.

16. The system of claim 1, wherein said one or more measured vacuum level values from said vacuum level sensing circuit comprises a series of repetitive vacuum level measurements, and wherein each subsequent vacuum level measurement form said series of repetitive vacuum level measurements after a first vacuum level measurement is less than 5seconds later in time than a immediately preceding measurement in said series of repetitive vacuum level measurements.

17. The system of claim 1 further comprising a load or deflection measurement sensor, wherein said load or deflection measurement sensor is used to determine a force being applied to a load of said system, wherein said system is configured to use said force to evaluate if certain criteria are met or exceeded and do at least one of (i) limit an operational function of said system, (ii) change how said system operates, and (iii) provide information or warnings to an operator of said system, when said certain criteria are met or exceeded.

18. A system comprising:
a vacuum attachment apparatus comprising a vacuum circuit, wherein said vacuum circuit includes a battery or fuel cell powered vacuum source, and a vacuum pad, wherein said vacuum attachment apparatus is usable to vacuum attach to a surface of an object;
an electronic controller operable to execute instructions;
a vacuum level sensing circuit operable to measure a level of vacuum in said vacuum circuit and to distinguish between three or more ranges of vacuum levels; and
one or more sensors configured to measure at least one of voltage and current from the battery;
wherein said electronic controller is configured to evaluate said battery's condition based on readings from said one or more sensors and configured to use said readings to perform at least one of (i) limit or modify a function of the system and (ii) notify an operator of a need for battery replacement, when it is determined that said battery's condition does not meet a selected set of criteria.

19. The system of claim 18, wherein said function is a mode of operation of said system to attach said vacuum attachment apparatus to an object, and wherein said electronic controller is configured to prevent said system from entering said mode of operation to attach to an object when said battery's condition does not meet said selected set of criteria.

20. The system of claim 18, wherein said system further comprises:
at least one battery for providing power to one or more components of said system;
a voltage monitor for monitoring a voltage level of said battery; and
a current monitor for monitoring a draw of electrical current on said battery, wherein said voltage monitor and said current monitor values are recorded in a memory of said system and utilized by said electronic controller to determine whether said battery needs to be replaced by evaluating the relationship of voltage and current at one or more levels of current draw.

21. The system of claim 18, wherein said system is configured to (i) determine a first voltage of said battery; (ii) draw a current, wherein said current draw is indicative of a load on said system; (iii) determine a second voltage of said battery based on said current draw; and (iv) use a difference between said first voltage and said second voltage in assessing an electrical condition of said battery.

22. A system comprising:
a vacuum attachment apparatus comprising a vacuum circuit, wherein said vacuum circuit includes a battery or fuel cell powered vacuum source, and a vacuum pad, wherein said vacuum attachment apparatus is usable to vacuum attach to a surface of an object;
an electronic controller operable to execute instructions;
a vacuum level sensing circuit operable to measure a level of vacuum in said vacuum circuit and to distinguish between three or more ranges of vacuum levels;
wireless communications functionality comprising a transmitter, wherein at least one output signal comprises a signal for wirelessly transmitting one or more of warnings, system status information, commands for cooperative operation, logged operational records, and other current or stored information to a separate wireless communications device.

23. The system of claim 22 further comprising additional wireless communications functionality, wherein said additional wireless communications functionality comprises a receiver capable of receiving signals from at least one of (i) a similar vacuum attachment device and (ii) a personal electronic device, and wherein at least one received signal comprises a signal for at least one of operational control, updating settings, updating software, other data.

* * * * *